United States Patent

[11] 3,594,995

| [72] | Inventors | Charlie J. Soules<br>1115 Willow, Yakima, Wash. 98902;<br>Thomas Lee Evans, R.1 Box 405, Yakima, Wash. 98601 |
|---|---|---|
| [21] | Appl. No. | 738,990 |
| [22] | Filed | June 21, 1968 |
| [45] | Patented | July 27, 1971 |

[54] HOP-PICKING MACHINE
20 Claims, 23 Drawing Figs.

[52] U.S. Cl. .................................................... 56/10.7,
   56/130, 56/14.5
[51] Int. Cl. .................................................... A01d 45/30
[50] Field of Search .......................................... 56/19,
   126—130, 153, 330

[56] References Cited
UNITED STATES PATENTS

| 2,544,650 | 3/1951 | Block et al. | 56/153 |
| 2,893,194 | 7/1959 | Lamouria | 56/331 |
| 1,948,975 | 2/1934 | Urschel | 56/19 |
| 2,447,122 | 8/1948 | Horst, Jr. | 56/130 |
| 2,645,893 | 7/1953 | Horst, Jr. | 56/19 X |
| 3,210,917 | 10/1965 | Boyce et al. | 56/19 |
| 3,396,521 | 8/1968 | McKibbon et al. | 56/19 X |

Primary Examiner—Louis G. Mancene
Assistant Examiner—J. N. Eskovitz
Attorney—Strauch, Nolan, Neale, Nies & Kurz ABSTRACT: A machine for field picking hops from vines hanging from overhead supports which includes graspers for maintaining the vines in picking position as they move through the machine, picking cats for stripping the hops from the vines, a conveyor arrangement for carrying the hops away, a cutter for severing the vines to free them from the supports, and an arrangement for expelling picked vines from the machine.

INVENTORS
CHARLIE J. SOULES
THOMAS L. EVANS
BY Strauch, Nolan, Neale,
Nies & Kurz
ATTORNEYS INVENTORS
CHARLIE J. SOULES
THOMAS L. EVANS
BY Strauch, Nolan, Neale,
Nies & Kurz
ATTORNEYS

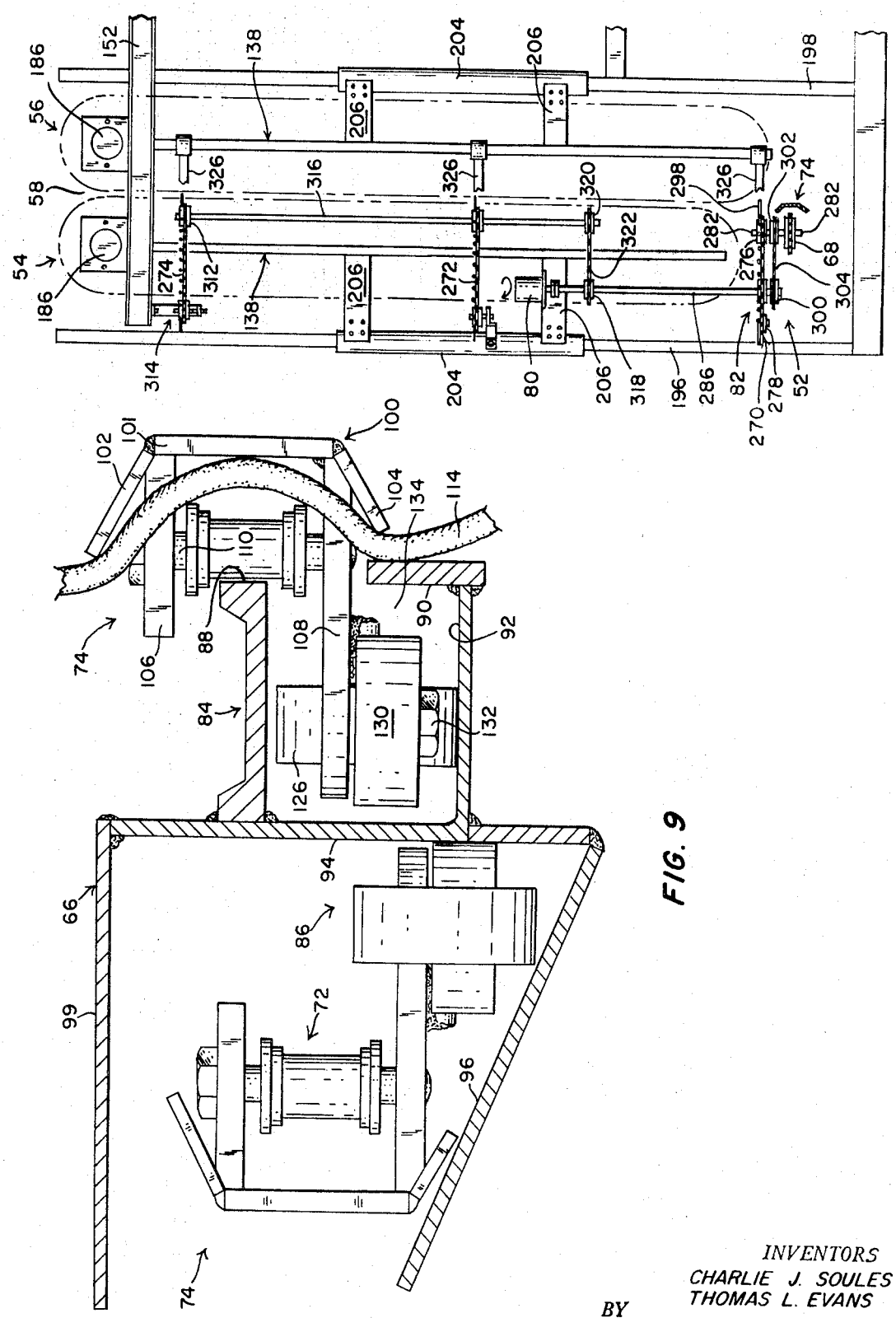

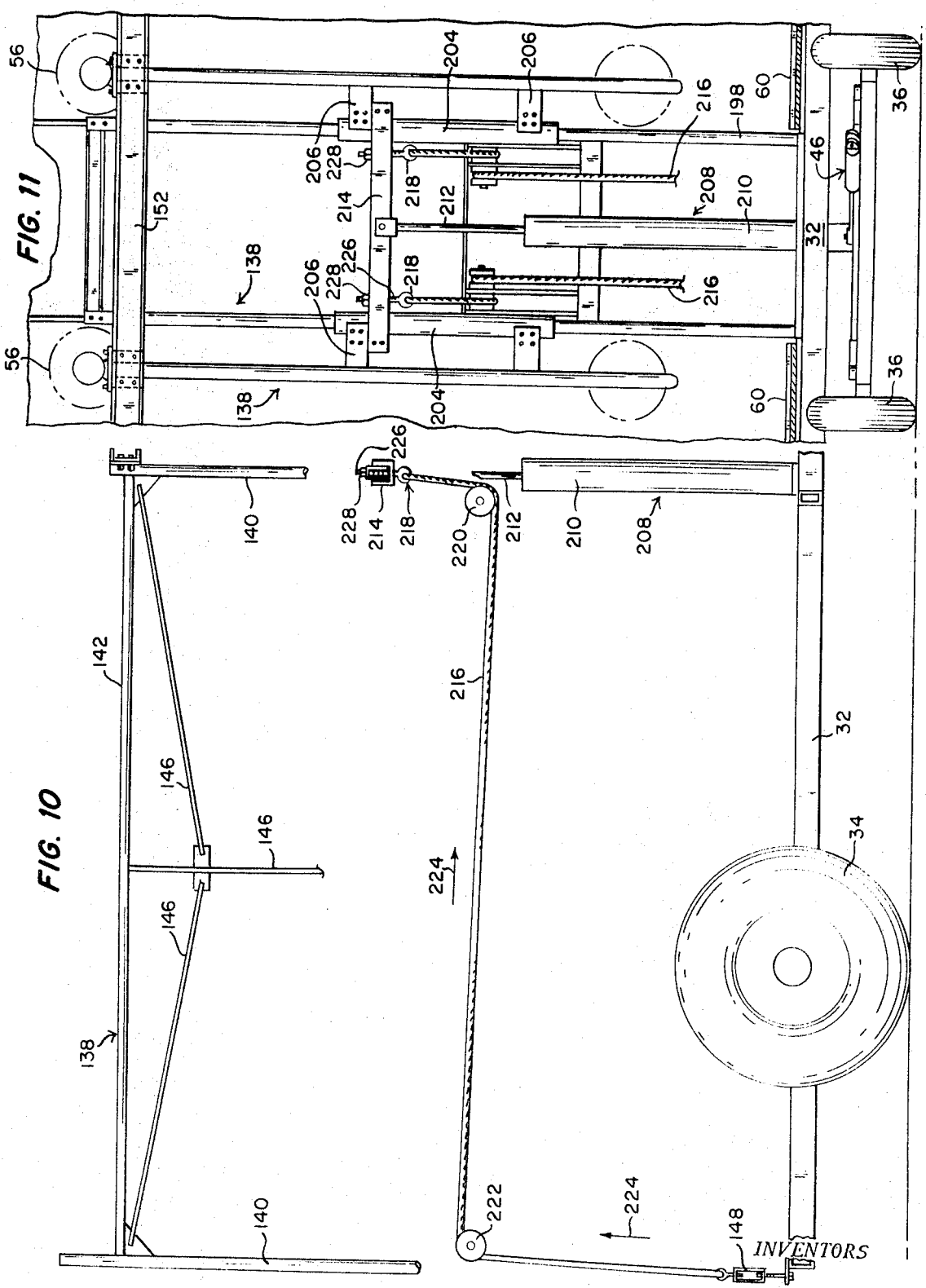

INVENTORS
CHARLIE J. SOULES
THOMAS L. EVANS

BY Strauch, Nolan, Neale, Nies & Kurz
ATTORNEYS

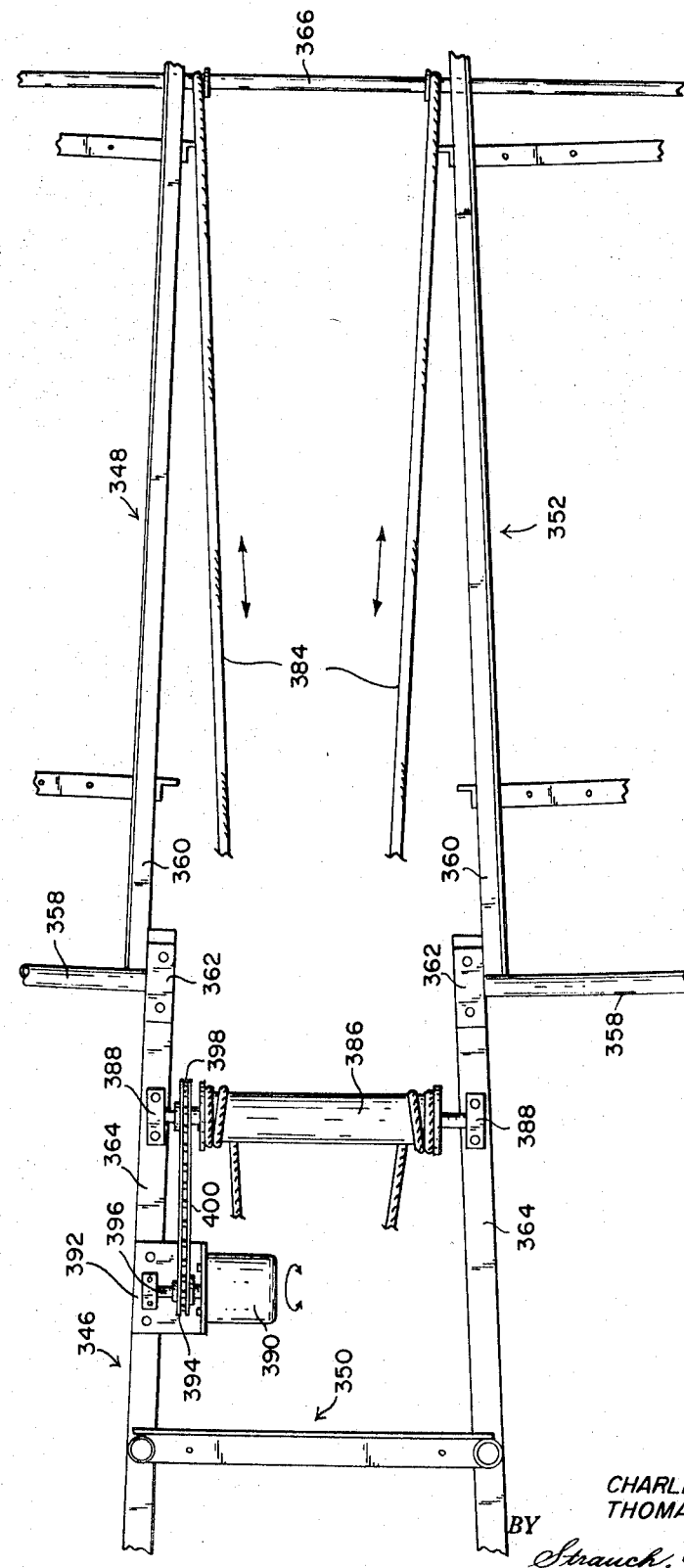

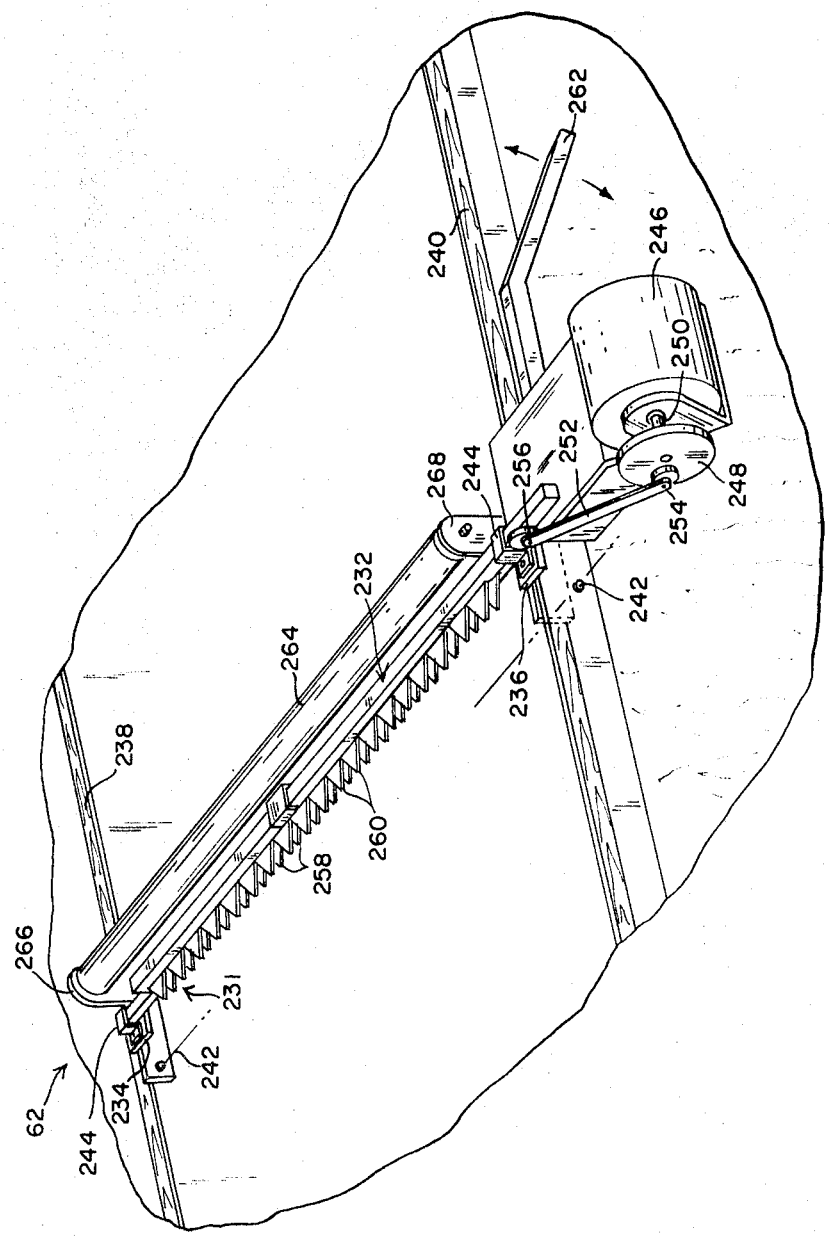

INVENTORS
CHARLIE J. SOULES
THOMAS L. EVANS
BY Strauch, Nolan, Neale, Nies & Kurz
ATTORNEYS INVENTORS
CHARLIE J. SOULES
THOMAS L. EVANS
BY
Strauch, Nolan, Neale,
Nies & Kurz
ATTORNEYS INVENTORS
CHARLIE J. SOULES
THOMAS L. EVANS
BY Strauch, Nolan, Neale, Nies & Kurz
ATTORNEYS

HOP-PICKING MACHINE

This invention relates to hop-picking machines and, more particularly, to novel, improved machines for field picking hops from vines hanging from overhead wires or trellises or other supports.

Until recent years hops were hand picked from the vines by field workers. In the last several years, however, machine picking has supplanted hand picking to a considerable extent. The machine pickers heretofore in use are of the stationary-type shown, for example, in U.S. Pat. No. 2,669,172 to Regimbal. While stationary hop-picking machines reduce the amount of hand labor involved, a considerable number of individuals are still required since the vines must be cut from their trellises, loaded into trucks and hauled to the picking machine, and hand fed into the machine.

To further reduce the labor required in picking hops, it has been suggested that the hips be machine picked from the vines in the field itself. Machines proposed for picking hops in this manner are described in U.S. Pat. Nos. 2,447,122 and 2,645,893 to Horst. Hop-picking machines of the type disclosed in the Horst patents have a number of drawbacks and have not been used to any appreciable extent to field pick hops and in fact could not be used in a present day field because of the manner in which the vines are fastened to the overhead supports.

We have now developed a novel, improved machine for filed picking hops which does not have the drawbacks of machines heretofore proposed for this purpose and accordingly represents a significant advance in the art over the latter. The novel hop-picking machines of the present invention are preferably self-propelled and, generally speaking, include graspers for engaging the lower ends of the vines and maintaining them in picking position as they move through the machine, picking cats for stripping the hops from the vines, a conveyor arrangement for carrying the hops away, a cutter for severing the vines to free them from the supports, and an arrangement for expelling picked vines from the machine.

One of the important advantages of the novel hop-picking machine described herein is that, being self-propelled, it can be maneuvered through a field more easily and much faster than the cumbersome "pushed-type" picker described in the Horst patents identified above and is accordingly capable of picking hops at a much higher rate. Another advantage, also resulting in increased capacity, is that the machines of the present invention are capable of picking two rows of vines simultaneously in contrast to the patented Horst machines which are single-row pickers.

In the Horst machines, the vines are pulled down through the machine as they are picked. Accordingly, a field hand must accompany the machine and cut the vines free from the trellises as they move into the machine. Applicant's novel machine in contrast does not depend on downward movement of the vines they are picked; and, moreover, it is provided with its own cutter for severing the vines to free them from the trellises. Accordingly, the necessity of employing hand labor for this purpose is eliminated by the present invention together with the attendant expense.

In conjunction with the foregoing, another novel and important feature of the present invention is that the picking cats are vertically adjustable. This makes it possible to quickly adjust the cats as the heights of the overhead supports change so that the vines can be picked clean up to the supports.

Another important feature of the present invention is a novel conveyor for the hops stripped from the vines which normally discharges into a truck or the like but can be employed to store picked hops so that the machine can continue to pick while a loaded truck is being replaced or the machine is turning at the end of a row, etc. In similar circumstances the picking operation would have be stopped in heretofore proposed machines such as those described in the Horst patents, for example.

Yet another important feature of the present invention is a novel grasper line for holding the vines in the proper position for picking in which the graspers are moved at a speed matching the ground speed of the picking machine. Further, the grapser line is configured to compensate for sagging vine-supporting wires, thereby ensuring that the vines are grasped at the proper location.

Other important features of the invention are a novel cutter mechanism for severing the vines and freeing them from the trellises and a novel mechanism for expelling the picked vines from the machine. Yet another novel and important feature of the invention is that the operating mechanisms are powered entirely by hydraulic motors, substantially eliminating belt and chain and similar drives. This makes the novel machines disclosed herein significantly simpler than comparable prior art harvesters.

From the foregoing it will be apparent that one important and primary object of the present invention is the provision of novel, improved machines for field picking hops.

A related and important but more specific object of this invention resides in the provision of novel, improved mobile machines for field picking hops from vines hanging from overhead supports.

Other even more specific but important objects of the invention reside in the provision of hop-picking machines in accord with the preceding objects which:

1. require the use of significantly less hand labor than heretofore proposed hop-picking machines of the same general character;
2. are self-propelled and can accordingly be maneuvered through a field more readily and faster than heretofore proposed mobile hop-picking machines;
3. are adapted for use in modern day fields;
4. are capable of picking hops at a much higher rate than heretofore proposed machines of the same general character;
5. are much more versatile than heretofore proposed machines of the same general character; and
6. are comparatively uncomplicated and, accordingly, economical to construct and to maintain.

Other important objects, additional novel features, nd further advantages of the present invention will become apparent from the appended claims and as the ensuing detailed description and discussion of a preferred embodiment of the invention proceeds in conjunction with the accompanying drawing.

In the drawing:

FIG. 9 is a section through the grasper line;

FIG. 10 is a fragmentary side view of the hop-picking machine illustrating details of the mechanism provided to raise and lower the picking assembly;

FIG. 11 is a fragmentary rear view of the machine illustrating much the same type of details as FIG. 10;

FIG. 15 is a plan view of mechanism provided for raising and lowering the hop-discharging sections of the conveyors;

FIG. 16 is a perspective of a cutter mechanism provided to sever the hop vines from their overhead supports;

FIG. 17 is a fragmentary rear view of the hop-picking machine designed to illustrate the details of mechanism incorporated in the machine for ejecting vine from which the hops have been stripped;

Figure 1:
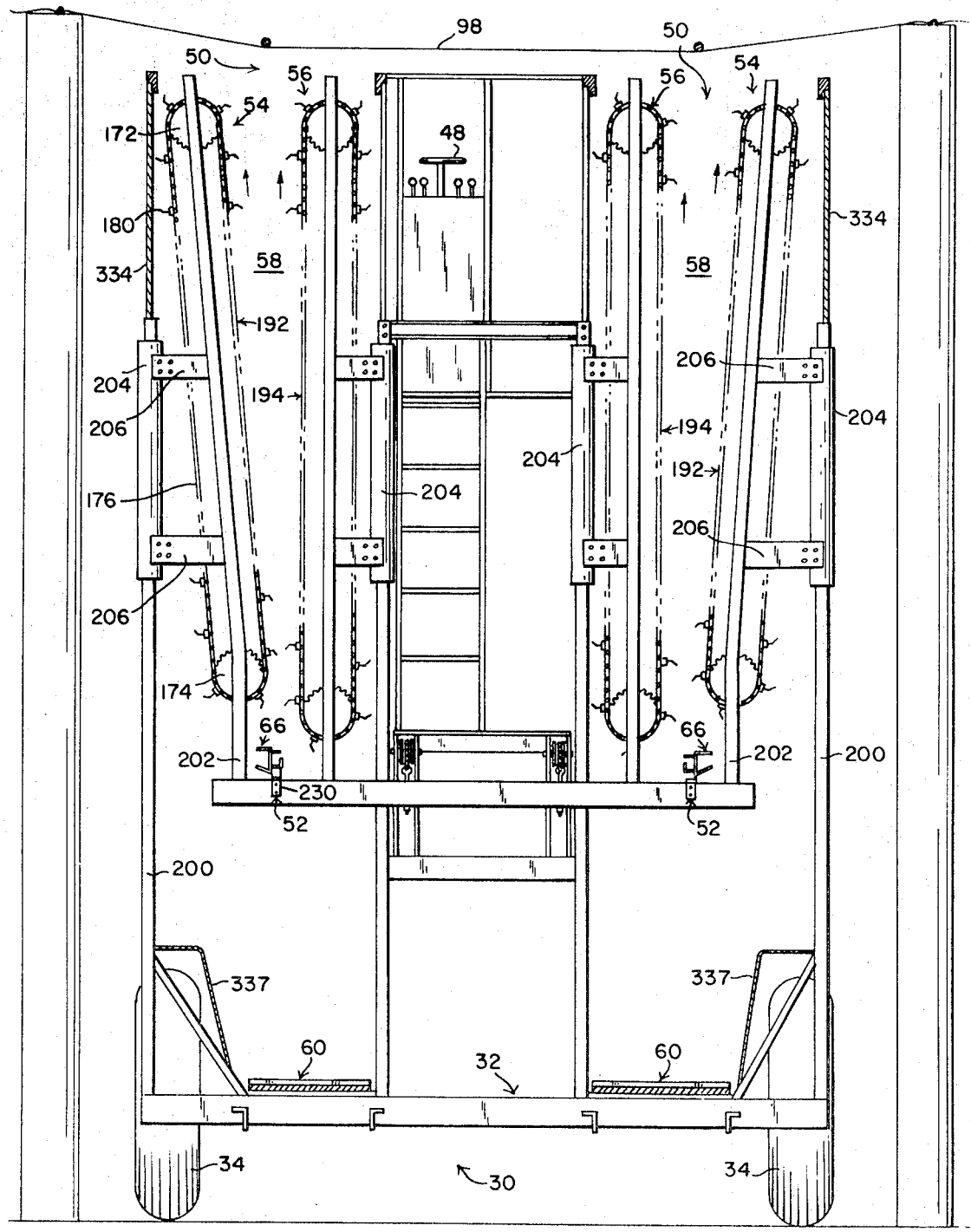
FIG. 1 is a front view of a hop-picking machine constructed in accord with the principles of the present invention a number of components having been deleted for the sake of clarity.
Figure 2:
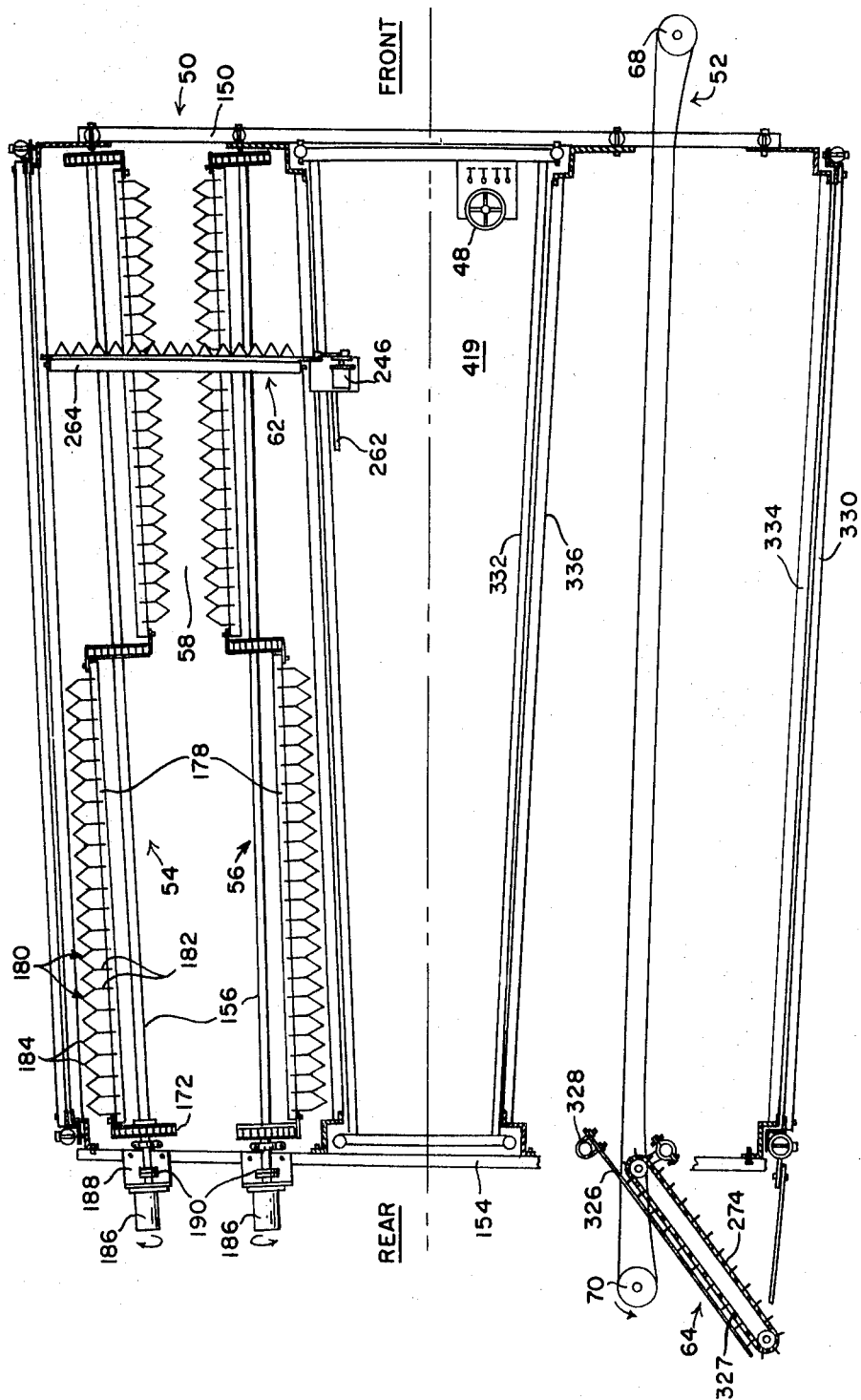
FIG. 2 is a partial plan view of the hop-picking machine of FIG. 1.

Referring now the the drawing, FIGS. 1 and 2 depict in generally diagrammatic form a self-propelled hop-picking machine 30 constructed in accord with the principles of the present invention. Machine 30 includes a chassis or framework 32 supported by running gear including traction wheels 34 and dirigible wheels 36 at the front and rear of the machine, respectively. A conventional gasoline engine 38, provided to propel the machine, is drive connected to traction wheels 34 through an automatic transmission 40 and a differential 42. The motor also drives a hydraulic pump 44 which supplies the operating fluid for a conventional power steering unit 46 by which the dirigible wheels 36 of the machine are turned as the operator manipulates steering wheel 48. The foregoing components may be of any appropriate conventional construction and will accordingly not be described further herein except as required to explain other aspects of the invention.

With continued reference to FIGS. 1 and 2, the chassis 32 of machine 30 also supports two substantially identical hop-picking lines identified by reference character 50. This provision of two picking lines is an important feature of the present invention. First, it doubles the picking capacity of an otherwise comparable single-row picker. In addition, because of the manner in which the vines are planted and tied to the overhead supports, it is necessary to cut the lower ends of the vines of two adjacent rows loose before picking the vines with a machine of the general type described herein. With a one-row picker the vines in the second row will sometimes wilt before they can be picked. This is disadvantageous since the hops are more difficult to remove from wilted vines. This problem is of course completely eliminated by the present invention.

Figure 3:
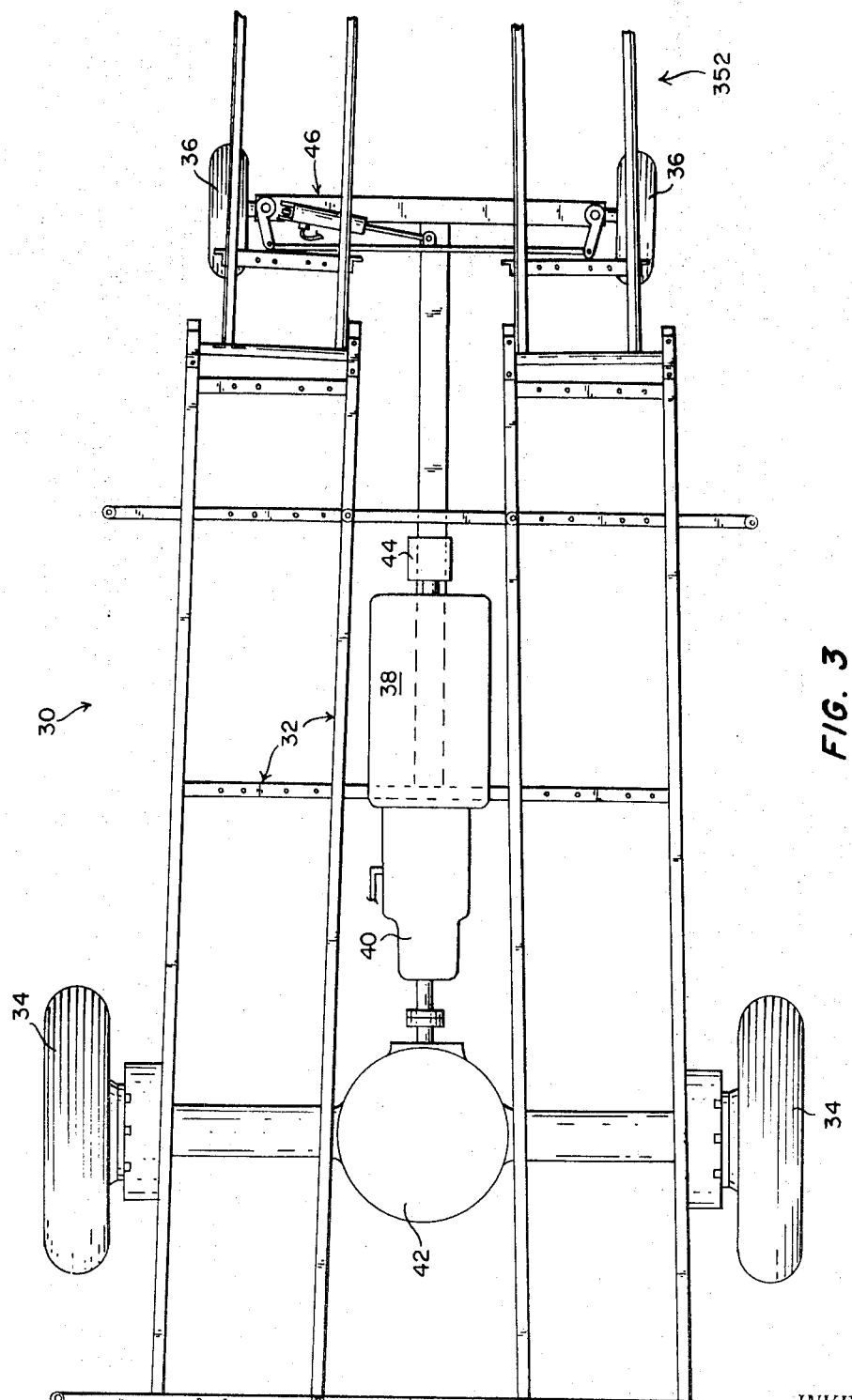
FIG. 3 is a plan view of the chassis of the hop-picking machine.

Referring now to FIGS. 2 and 3, each of the two identical picking lines 50 includes a grasper line 52 for engaging the lower ends of the vines and maintaining the vines in a vertical picking position as the machine moves past them and a pair of cooperating picking cats 54 and 56 for stripping the hops from the vines as they move through the passage 58 between the cats. The hops thus stripped from the vines fall onto chassis-supported conveyors 60 which carry the hops away and discharge them into a truck or other vehicle.

Also supported from chassis 32 is a novel sickle-bar-type cutter mechanism 62 for each picking line 50. This mechanism severs the vines from their overhead supports as they move through the passage 58 between the picking cats 54 and 56.

The final major subsystems of machine 30 are vine-expelling mechanisms identified generally by reference character 64. As the stripped vines are released from the grasper lines, the associated expelling mechanisms engage the picked vines and expel them from the machine.

As best shown in FIGS. 6—9, each of the two grasper lines 52 includes an elongated track 66 extending longitudinally of machine 30, a pair of sprockets 68 and 70 rotatably mounted on the front and rear ends of track 66, respectively, an endless roller chain 72 trained around the sprockets, and grasper devices 74, fixed to the endless chain 72 at predetermined fixed intervals therealong. Roller chain sprocket 70 is driven by a fluid-operated, preferably hydraulic, motor 80 through a drive train identified generally by 82 (see FIG. 17). As the sprocket rotates, it drives roller chain 72, moving grasper devices 74 from the front toward the rear of the machine along an inner run 84 and returning them to the front of the machine along an outer run 86. The movement of the roller chain and grasper devices 74 is timed to the ground speed of the hop-picking machine, Accordingly, the graspers maintain the vines being picked in a vertical picking position as they are traversed by the machine and the vines move through the passage 58 between the picking cats 54 and 56.

Elongated track 66, which will typically be fabricated from conventional structural shapes, the details of which are not critical, has vertical bearing surfaces 88 and 90 and a horizontal bearing surface 92 on inner run 84 and, on outer or return run 86, a vertical bearing surface 94 and an upwardly and outwardly inclined lower bearing surface 96. These bearing surfaces are provided to position the grasper devices laterally and in the vertical plane as they are carried along the inner and outer runs by roller chain 72.

Figure 6:
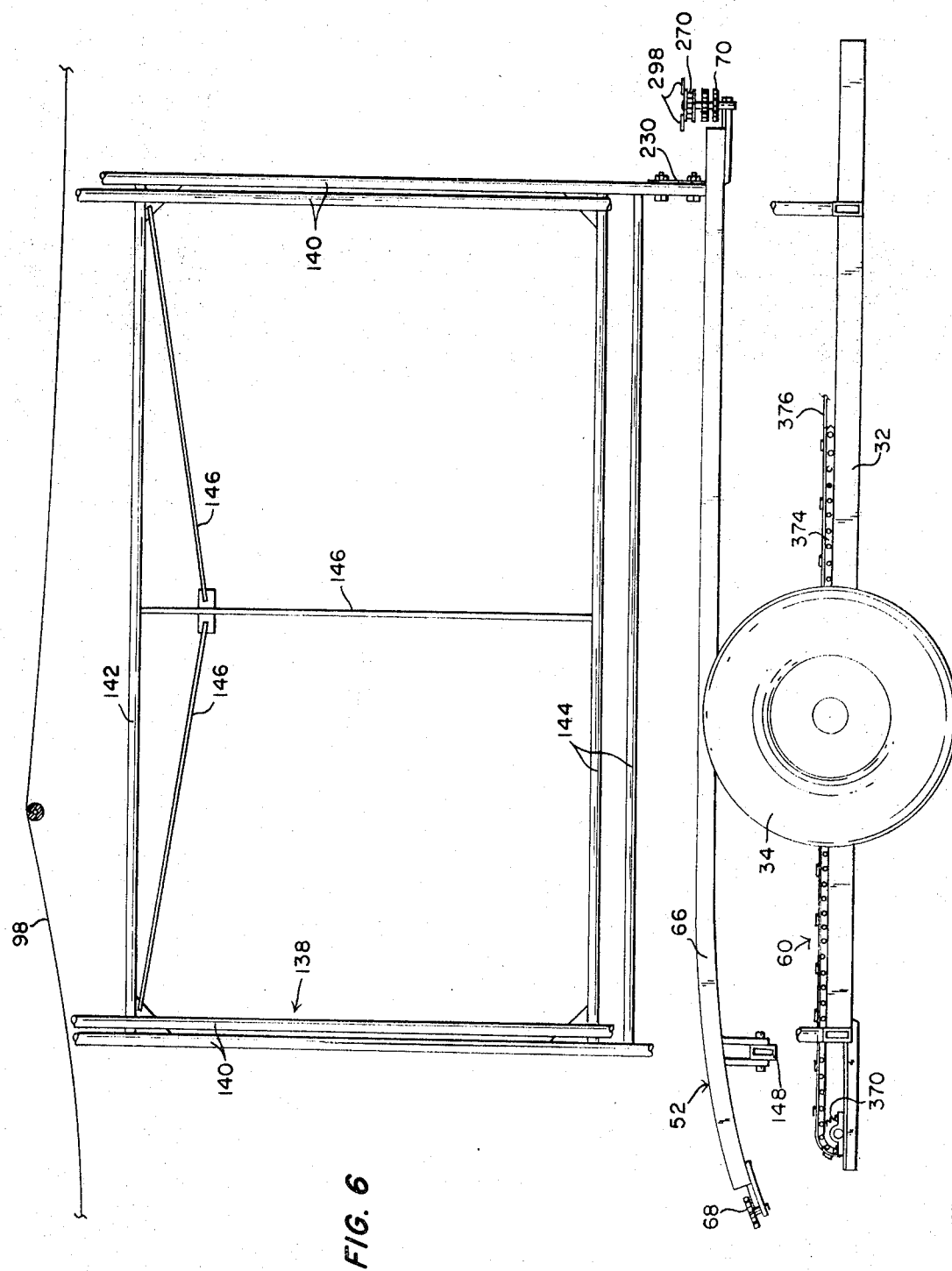
FIG. 6 is a fragmentary side view of the machine showing details of a conveyor and grasper line incorporated in it as well as structural details of the picking cats.

In conjunction with the foregoing it will be noted from FIG. 6 that track 66 is curved downwardly at the front end of the hop-picking machine. This is to accommodate sags in the overhead wires 98 from which the vines are supported so that the distance between the grasper devices 74 and the overhead wire will remain substantially constant.

Track 66 also includes a laterally extending member or cover 99 spanning outer run 86. This member cooperates with the track member on which vertical bearing surface 88 is formed to keep track 66 clean of hops, leaves, and other debris.

Figure 7:
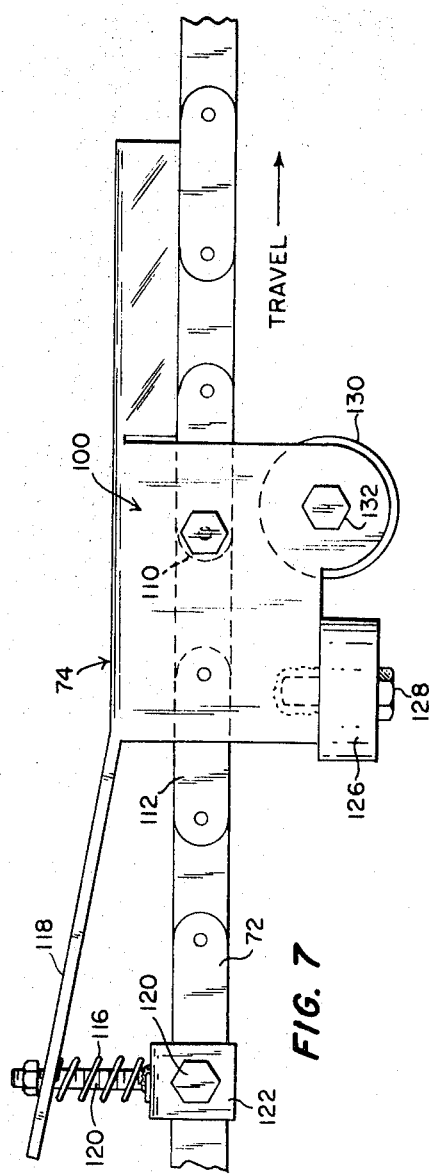
FIG. 7 is a top view of a grasper device employed in the hop-picking machine of FIG. 1.
Figure 8:
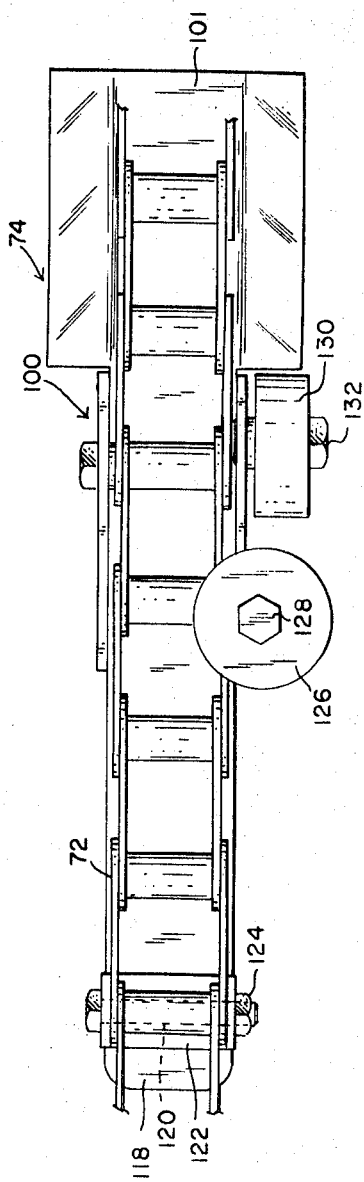
FIG. 8 is a side view of the grasper device.

Referring now specifically to FIGS. 7—9, the devices 74 include jaws 100 fabricated from common structural shapes and including an elongated vertical jaw member 101, an upwardly inclined upper jaw member 102, a downwardly inclined lower jaw member 104, and laterally extending jaw-mounting members 106 and 108. The jaw 100 is fixed to roller chain 72 by a pin 110 which extends through upper mounting member 106 and a link 112 of roller chain 72 and is threaded into lower grasper-jaw-mounting member 108.

As shown in FIG. 9, the grasper device is adapted to clamp a hop vine stem 114 between the grasper jaw 100 and roller chain 72. Clamping force is supplied by a compression spring 116 disposed between the roller chain and the tail end 118 of jaw member 101 and supported by a stud 120 fixed to the roller chain by a bracket 122. A nut 124 on the outer end of the stud maintains the components in assembled relationship and can be threaded up and down the stud to accommodate the grasper jaw to vines of different sizes.

Referring again to FIGS. 7—9, the grasper devices also include a roller 126 rotatably journaled on a transversely extending member 128 fixed to support member 108 and a roller cam 130 journaled for rotation about a vertical axis on a member 132 also fixed to member 108. As best shown in FIG. 9, roller 126 supports member 108 and, accordingly, roller chain 72 and grasper jaw 100 from bearing surface 92 of inner run 84 and bearing surface 96 of outer run 86 as the grasper devices move therealong. At the same time roller chain 72 and roller cam 130 cooperate with vertical track-bearing surfaces 88 and 90, respectively (see FIG. 9), to properly laterally position the jaws 100 of the grasper devices as they move down inner runs 84.

In this conjunction as shown in FIG. 9, there is a gap 134 between roller cam 130 and vertical bearing surface 90 when roller chain 72 is engaged with bearing surface 88. This gap is purposely provided so that grasper devices 74 may move laterally relative to the track to accommodate vines of different sizes.

Figure 20:
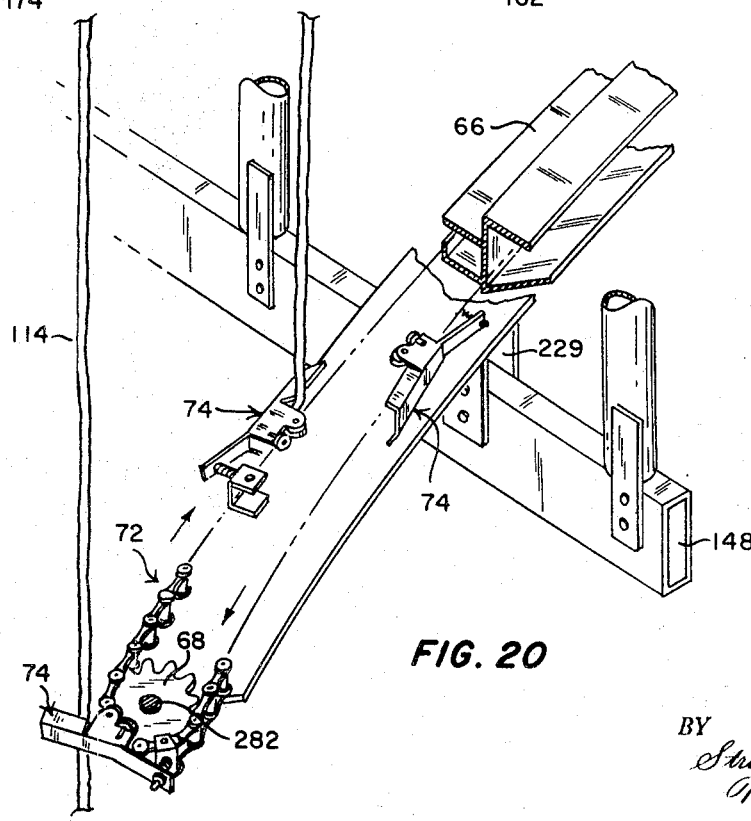
FIG. 20 is a perspective of the front section of a grasper line incorporated in the machine of FIG. 1.

Referring now to FIG. 20, as a grasper device 74 approaches the front end of hop-picking machine 30 and travels around the front grasper sprocket 68, the grasper jaw 100 swings away from roller chain 72 and engages the stem 114 of a hop vine to be picked between the jaw and roller chain 72. Thereafter, as the grasper device starts down the inner run 84 of track 66 toward the rear of machine 30, it swings back against the roller chain as shown in FIG. 20, firmly clamping the stem 114 of the vine between the jaw and chain.

As the grasper devices 74 reach the rear end of picking machine 30, their jaws 100 swing away from roller chain 72 in the same manner that they do at the front of the machine, releasing the stems of the vines 114. Also, at this point, the vine expelling mechanisms 64 engage the vines and eject them from the hop-picking machine.

Referring now primarily to FIGS. 1, 2, 4—6, 10, and 11, it will be remembered that there are two picking lines 50 with a pair of cooperating picking cats 54 and 56 in each line. Each of these four picking cats is of generally the same construction and includes a framework 138 fabricated of vertical tubular members 140, upper and lower horizontal tubular members 142 and 144, and braces 146 (see especially FIG. 6). The four cat frames 138 are joined into a unitary structure or picking assembly 147 by transversely extending beams 148 and 150 at the back of hop-picking machine 30 and transversely extending beams 152 and 154 at the front of the machine.

Figure 21:
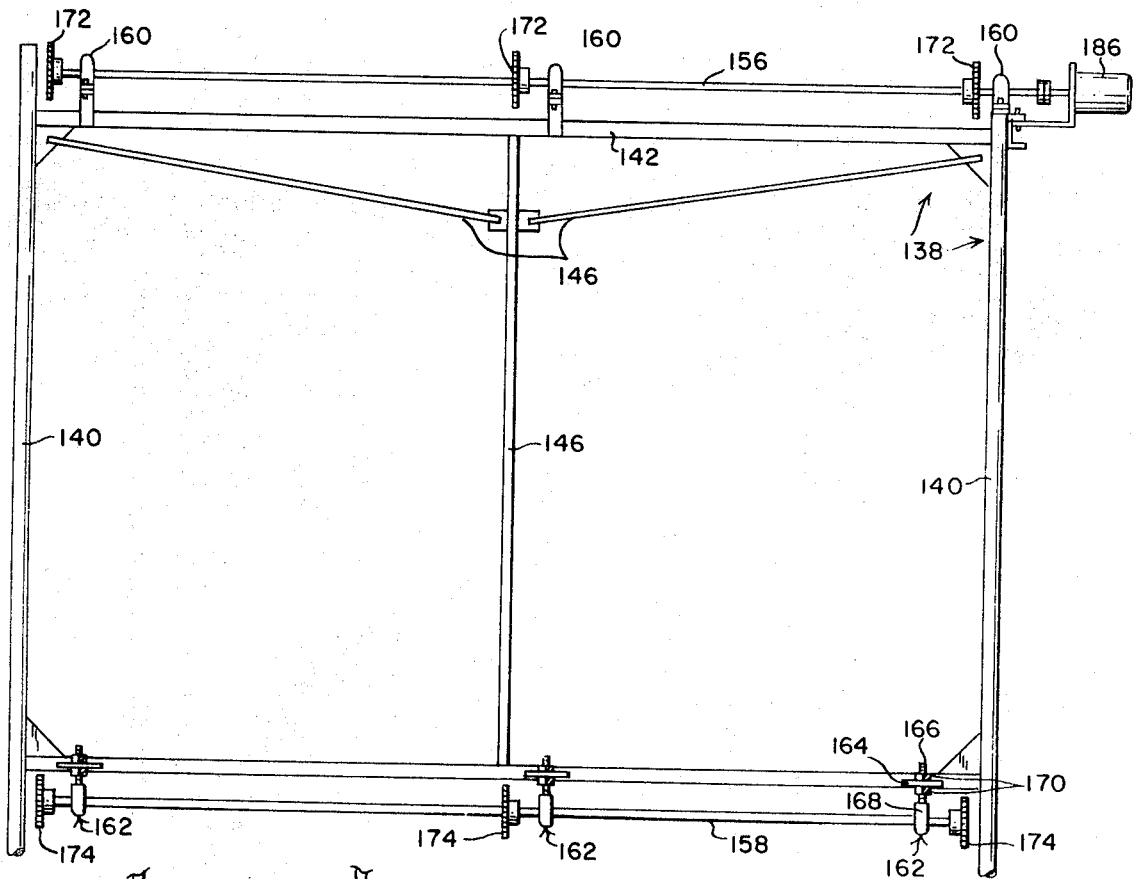
FIG. 21 is a side view of a picking cat incorporated in the machine of FIG. 1 with a number of components omitted to show the cat operating mechanism in more detail.

As best shown in FIGS. 1, 2, and 21, elongated, longitudinally extending shafts 156 and 158 are rotatably journaled in and supported from each cat frame 138 adjacent the upper and lower horizontal frame members 142 and 144, respectively by stationary bearing assemblies 160 and adjustable bearing assemblies 162. The latter include flanges 164 fixed to bottom frame member 144, threaded members 166 extending through flanges 164 and fixed at their lower end to bearings 168, and nuts 170 on the opposite side of each flange 164 by which the associated member 166 may be maintained in a vertically adjusted position relative to the associated flange.

Fixed to upper and lower shafts 156 and 158 are three pairs of cooperating upper and lower sprockets 172 and 174 with an endless chain 176 being trained around the sprockets in each pair. Fastened between the intermediate one of the three chains 176 and each of the two end chains are a series of parallel, spaced-apart bars or slats 178, there accordingly being two sets of such bars. Fixed to bars 178 are picking fingers 180 which have generally parallel legs 182 and V-shaped end portions 184 bent at an angle such that they are upwardly inclined when the fingers are located on the facing, vertical sides of the cooperating cats. This arrangement is illustrated and described in more detail in, for example, U.S. Pat. No. 2,447,122 to Horst, which hereby incorporated by reference herein.

The elongated shafts 156 at the tops of the picking cat frames are rotated by rotary-type, fluid-operated, preferably hydraulic motors 186 supported from the transversely extending beam 154 connecting the upper rear ends of the picking cat frames by mounting brackets 188, which may be of any desired configuration. Motors 186 are drive-connected to the associated shafts 156 through conventional couplers 190.

As shafts 156 rotate, chains 176, together with bars 178 and picking fingers 180, move upwardly in facing vertical flights 192 and 194 in each pair of cooperating picking cats 54 and 56 with the fingers extending into the passage 58 between the cooperating picking cats. As the fingers move upwardly, they strip the hops from the vines moving through the passage 58 between the cooperating picking cats in each pair with the hops picked from the vines falling by gravity onto conveyors 60. As discussed in detail above, the hop vines are maintained in the proper position during this picking operation by grasper devices 74 of the two grasper lines 52.

As mentioned previously, one of the novel and important features of the present invention is that the picking cats just described are vertically adjustable to accommodate variations in the height of the overhead supports from which the vines to be picked are suspended. More specifically, the unitary assembly 147 of the four picking cats and the transversely extending beams by which their frames are connected is supported for vertical sliding movement on outer and inner uprights 196 and 198 of picking machine framework 32 at the rear of the machine and similar uprights 200 and 202 at the front of the machine by tubular members 204 mounted for vertical sliding movement on the uprights and fixed to the picking cat frames by transversely extending supports 206.

Figure 4:
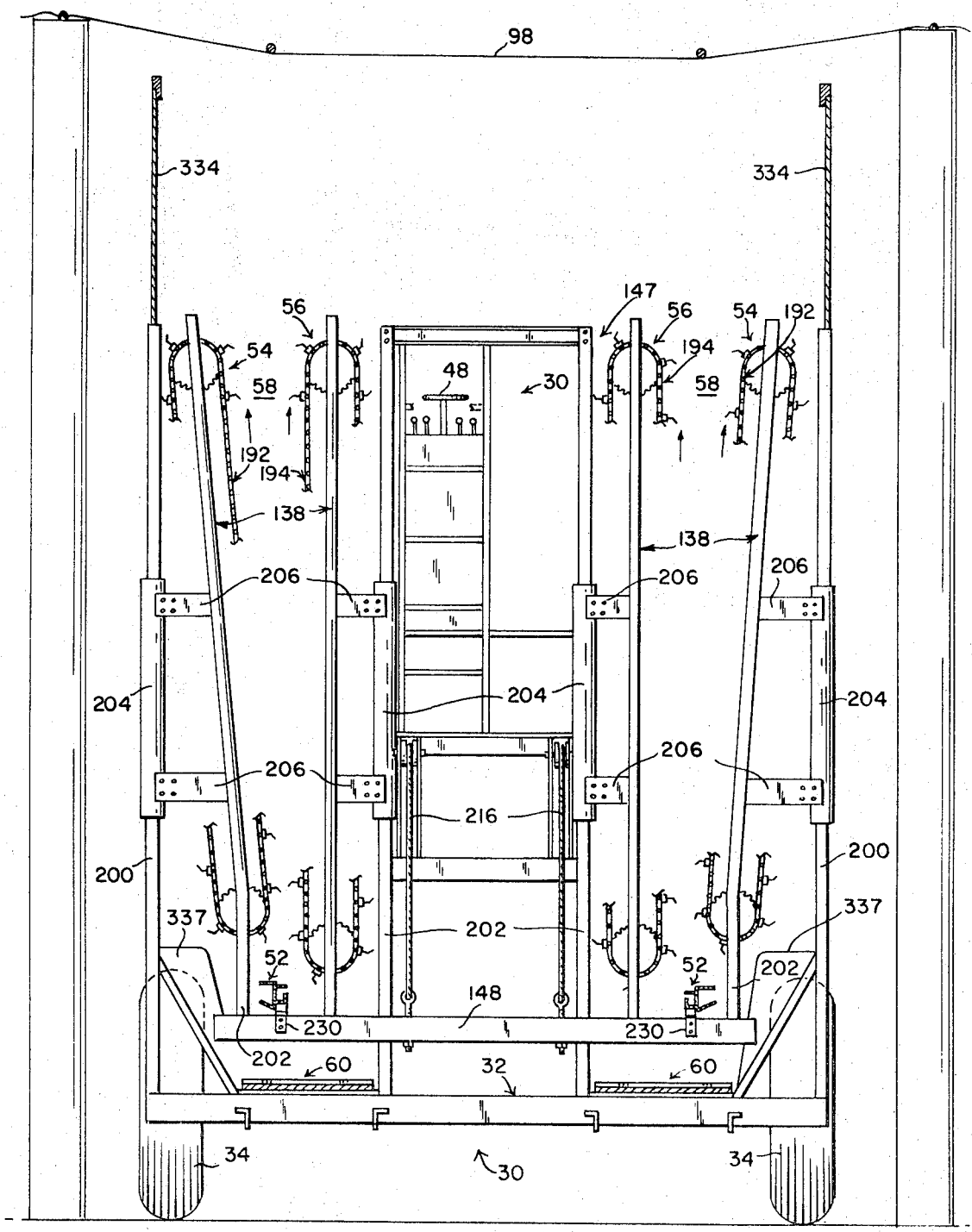
FIG. 4 is a view similar to FIG. 1 with the picking assembly of the machine in a lowered or retracted position.
Figure 5:
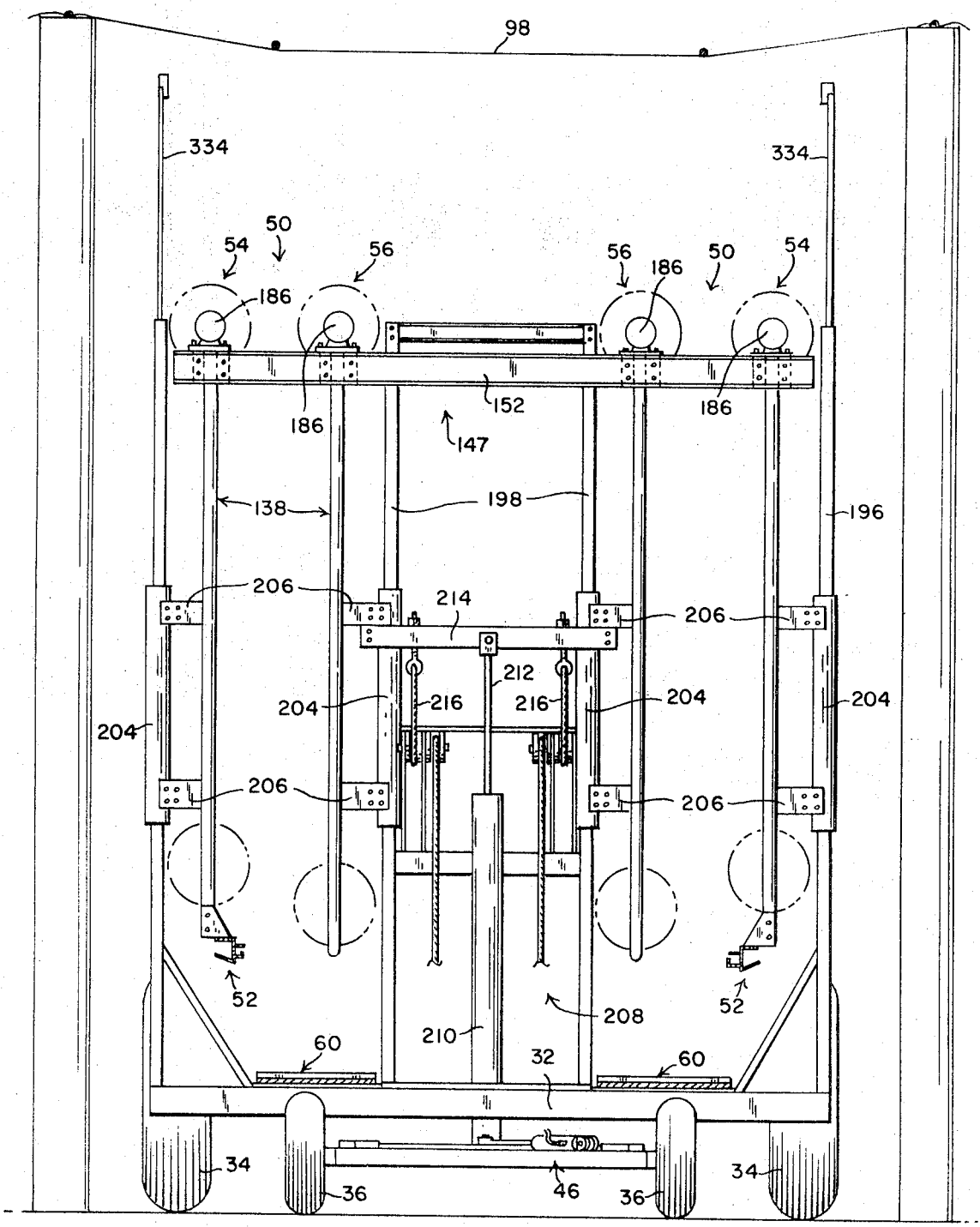
FIG. 5 is a view similar to FIG. 4 but looking from the rear toward the front of the machine.

The four cat frames may be elevated from the "down" position shown in FIG. 4 to the "up" position shown in FIG. 1 by energizing a fluid-operated, preferably hydraulic motor 208 which includes a hydraulic cylinder 210 mounted on the picking machine framework 32 and a connecting rod 212 fixed between the piston of the motor (not shown) and a transversely extending beam 214 connected between and to the two innermost slides 204 of picking assembly 147 at the back of hop-picking machine 30. Admission of operating fluid to the lower end of hydraulic cylinder 210 drives the piston of the motor and connecting rod 212 upwardly, thereby elevating the rear end of picking assembly 147.

To insure that the front end of the assembly moves upward at the same rate as the rear end, cables 216 are connected to transverse beam 214 by adjustable connectors 218, trained around pulleys 220 and 222, which are rotatably supported in any convenient fashion from picking machine framework 32, and fastened to the transversely extending lower beam 148 at the front end of the picking assembly. Accordingly, as the rear end of the picking assembly is elevated by motor 208 and beam 214 moves upwardly, cables 216 move the direction shown by arrows 224 in FIG. 10, causing the front end of the assembly to move upward at the same rate as its rear end. Adjustable connectors 218, which will typically include threaded members 226 extending through beam 214 and nuts 228 threaded on members 226 above the beam, are provided so that the tension in cables 216 can be adjusted to the point where the front and rear ends of picking assembly 147 will move upwardly in unison.

As best shown in FIG. 6, the two tracks 66 of grasper lines 52 are supported from the lower, transverse beam 148 at the front of picking assembly 147 by brackets 229 and are fixed to the rear uprights 140 of the frames of outer graspers 54 by brackets 230. Accordingly, the grasper lines move up and down with the picking cats, thereby maintaining a constant vertical relationship between the grasper lies and picking cats.

Once the vines being picked have entered the passages 58 between the cooperating cats in the picking lines 50, they are vertically supported by the upwardly moving picking fingers 180 and may accordingly be cut loose from the overhead supports. This is accomplished by the cutting mechanisms 62 referred to briefly above. As best shown in FIGS. 2 and 16, each cutting mechanism 62 includes a stationary sickle bar 231 and a cooperating reciprocable sickle bar 323, both of which face the front of hop-picking machine 30. Stationary sickle bar 231 is welded at its opposite ends to end brackets 234 and 236, which are pivotally fixed to wall members 238 and 240 adjacent the outer flights of the picking cats 54 and 56 in the associated picking line 52 by horizontally extending pivot members 242. The reciprocating sickle bar 232 is journaled in mounts 244 also fixed to supports 234 and 236 with the sickle bar 232 being slidable back and forth in these mounts.

Movable sickle bar 232 is reciprocated by a mechanism including a rotary, fluid-operated, preferably hydraulic motor 246 mounted on sickle bar support 236. The rotary motion of the motor is converted to rectilinear motion to reciprocate the sickle bar by a disc 248 fixed to the motor output shaft 250 and a crank 252 connected to the periphery of disc 248 by a pivot pin 254 and to one end of the sickle bar by a pivot pin 256. Accordingly, as motor 246 rotates, sickle bar 232 is reciprocated to sever vines engaged between the teeth 258 of the stationary sickle bar and the teeth 260 of the movable sickle bar. A handle 262 is fixed to sickle bar support 236 permits the operator to tilt the sickle bars upwardly and downwardly as required to cut the vines closely adjacent the overhead supports.

As best shown in FIG. 16, the vine-cutting mechanism also includes a transversely extending roller 264 rotatably supported from supports 234 and 236 in brackets 266 and 268. The periphery of roller 264 extends above the sickle bars 231 and 232 and, accordingly, prevents the wires or other supports from which the vines are suspended from becoming entangled in the cutting mechanism.

Figure 18:
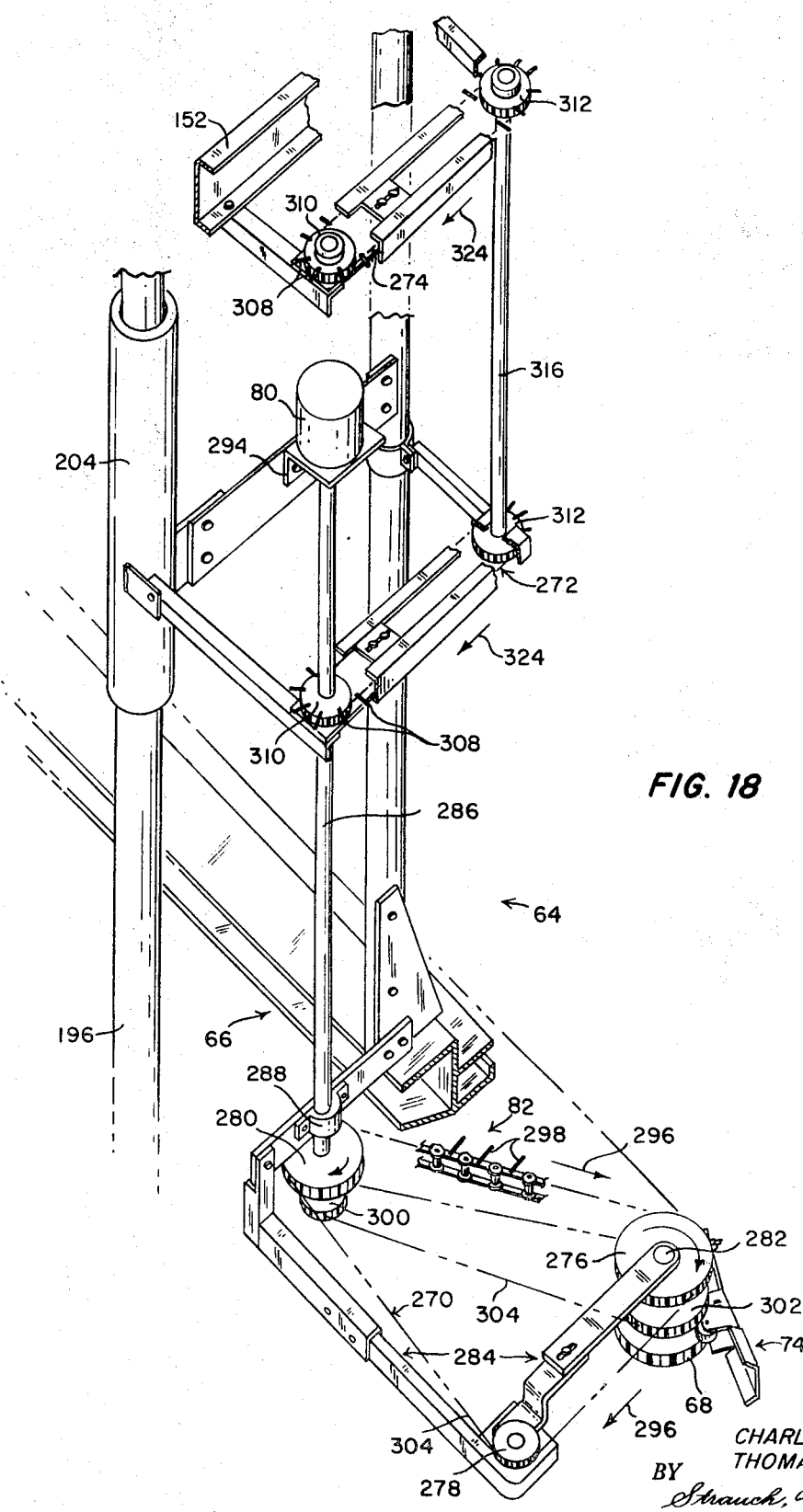
FIG. 18 is a perspective view of a portion of the mechanism shown in FIG. 17.

As discussed previously, the stripped hop vines are released from grasper devices 74 at the rear end of hop-picking machine 30 and the ejected or expelled from the machine by vine-expelling mechanism 64. As best shown in FIGS. 2, 17, and 18, there is an ejecting mechanism 64 associated with each of the picking lines 50, and each of these includes three endless toothed chains 270, 272, and 274 for engaging the stripped vines and ejecting them from the machine.

The vine-ejecting chain 270 is trained around three sprockets 276, 278, and 280. Sprocket 276 is rotatably supported on the same fixed, vertical shaft 282 as the sprocket 68 around which the roller chain 72 of the associated grasper mechanism 52 extends. Sprocket 278 is rotatably supported from the associated grasper line 52 and the frame 138 of the picking cat 54 in the associated line 50 by a bracket assembly, which may be of any desired construction, and is identified generally by reference character 284 in FIG. 18.

The third sprocket 280 is fixed to the lower end of a vertically extending drive shaft 286 which is rotatably supported in a bearing 288 fixed to bracket assembly 284 at its lower end and by the rotary-type hydraulic motor 80 referred to above at its upper end.

Shaft 286 is rotated during the operation of machine 30 by motor 80, which is supported from brace 206 by a suitable bracket 294. This motor drives endless chain 270 in the direction shown by arrows 296 in FIG. 18. As the endless chain follows the path shown by arrows 296 around sprocket 276, fingers 298 welded or otherwise fixed to the links of the chain engage the vines released by the grasper device jaw 100 as they open and eject them from the machine.

As mentioned above, motor 80 also drives the endless chain 72 of the associated grasper line 52 through a drive train 82. This drive train includes a sprocket 300 fixed to the lower end of shaft 286 below sprocket 280, a sprocket 302 fixed to or integral with the sprocket 68 around which grasper line chain 72 is trained, and a drive chain 304 trained around sprockets 300 and 302. Typically, the various sprockets in the drive trains of the grasper lines and ejecting mechanism will be so selected that the sprocket 276 of the ejecting mechanism will turn twice as fast the sprocket 68 of the grasper line. This has been found to be the most effective for efficient ejection of the stripped vines from machine 30.

Referring now primarily to FIGS. 17 and 18, the intermediate and upper vine-ejecting chains 272 and 274 are similar, each including vine-ejecting fingers 308 of the type just discussed in conjunction with chain 270 and being trained around sprockets 310 and 312. The two sprockets 310 and 312 are supported from various structural components of the picking assembly 147 by bracket assemblies identified generally by reference character 314. Sprockets 312 are fixed to a vertical, rotatable shaft 316 drive connected at its lower end to motor driven shaft 286 by sprockets 318 and 320 on shafts 286 and 316 and a drive chain 322 trained around the sprockets. Accordingly, motor 80 drives the intermediate and upper vine-expelling chains in the direction shown by arrow 324 in FIG. 18. This causes fingers 308 to engage and assist fingers 298 in ejecting the stripped vines from machine 30.

As shown in FIGS. 2 and 17, elongated flat springs 326 are mounted adjacent the vine-expelling legs 327 of intermediate and upper chains 272 and 274 by brackets 328 connecting the springs to vertically extending members 196 of picking machine framework 32. Springs 326 hold the stripped vines between the fingers 308 of the intermediate and upper chains 272 and 274 as they expel the stripped vines from machine 30.

Figure 22:
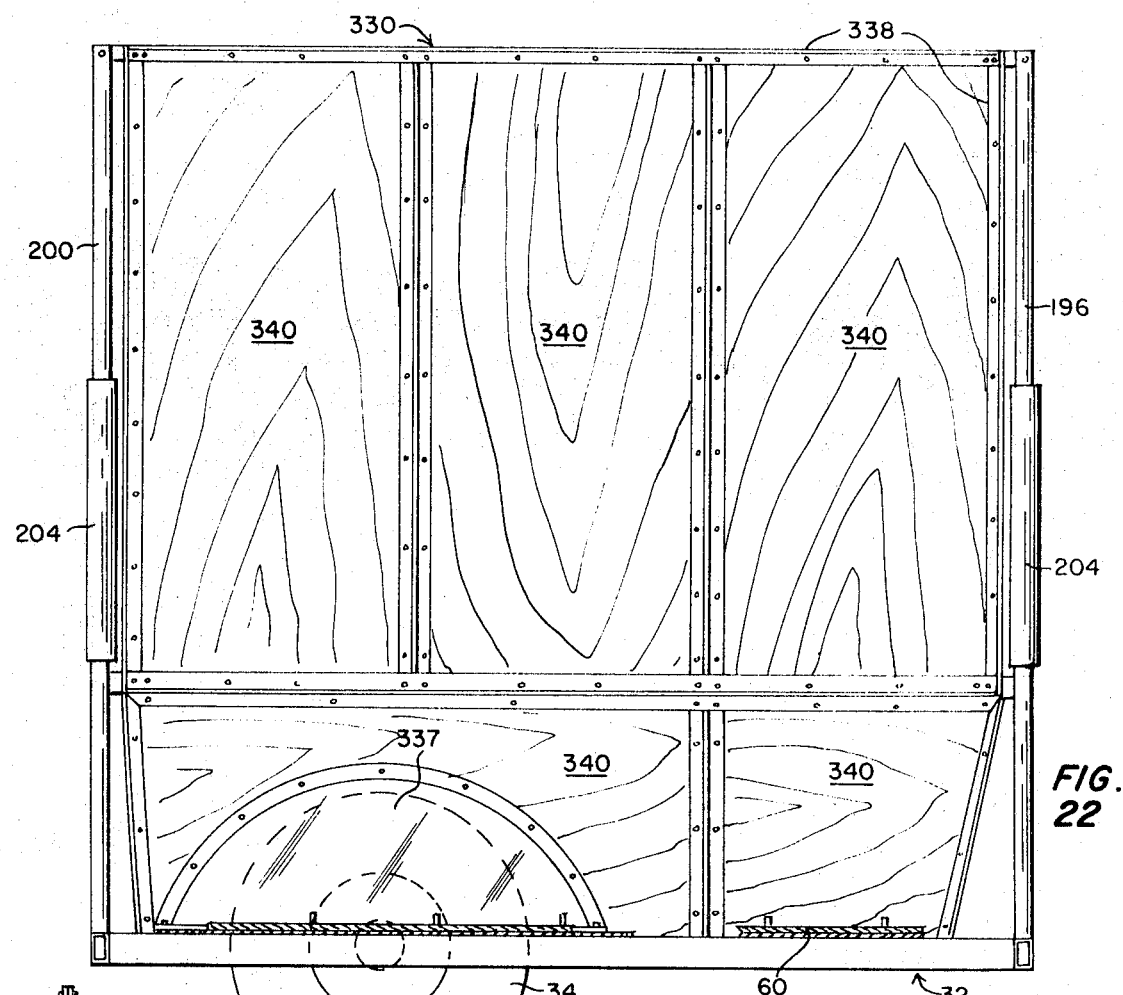
FIG. 22 is a fragmentary side view of the machine with a number of components deleted to show certain housing members provided to guide the stripped hops onto the conveyors.
Figure 23:
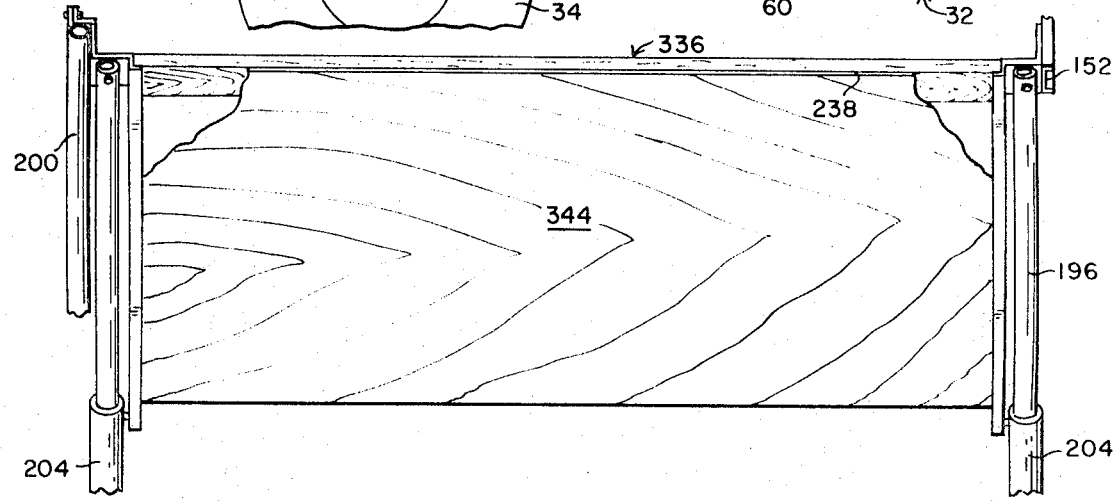
FIG. 23 is a view similar to FIG. 22 provided to show still other of the housing members.

Referring now to FIGS. 2, 22, and 23, the hops stripped from the vines being picked fall by gravity onto conveyors 60 associated with the two picking lines 50. To guide the hops onto the conveyors, each of the two picking lines 50 is provided with stationary outer walls 330 and 332, inner walls 334 and 336 which move up and down with the picking cat assembly 147, and wheel housings 337.

The details of these wall structures are not critical and may be varied as desired. Typically, as shown in the Figures just mentioned, however, the two stationary walls 330 and 332 will include an angle iron or similar framework 338 fixed to the main framework 32 of the hop-picking machine and plywood or similar panels 340 fastened to the framework.

The vertically moveable inner walls 334 and 336 may typically be varied in detail. In the exemplary application of the principles of the present invention disclosed herein, these walls include structural members 342 fixed to picking cat guides 204 and to transversely extending beams 150 and 154 to which the longitudinally extending, horizontal structural members 238 and 240 mentioned previously are fixed and plywood or similar panels 344 attached in any convenient fashion to the horizontal and vertical structural members.

Referring primarily now to FIGS. 1, 6, 12, 13, and 15, the conveyors 60 on which the stripped hops fall by gravity each include a fixed hop-receiving conveyor section 346 and a vertically elevatable hop delivery section 348.

Figure 12:
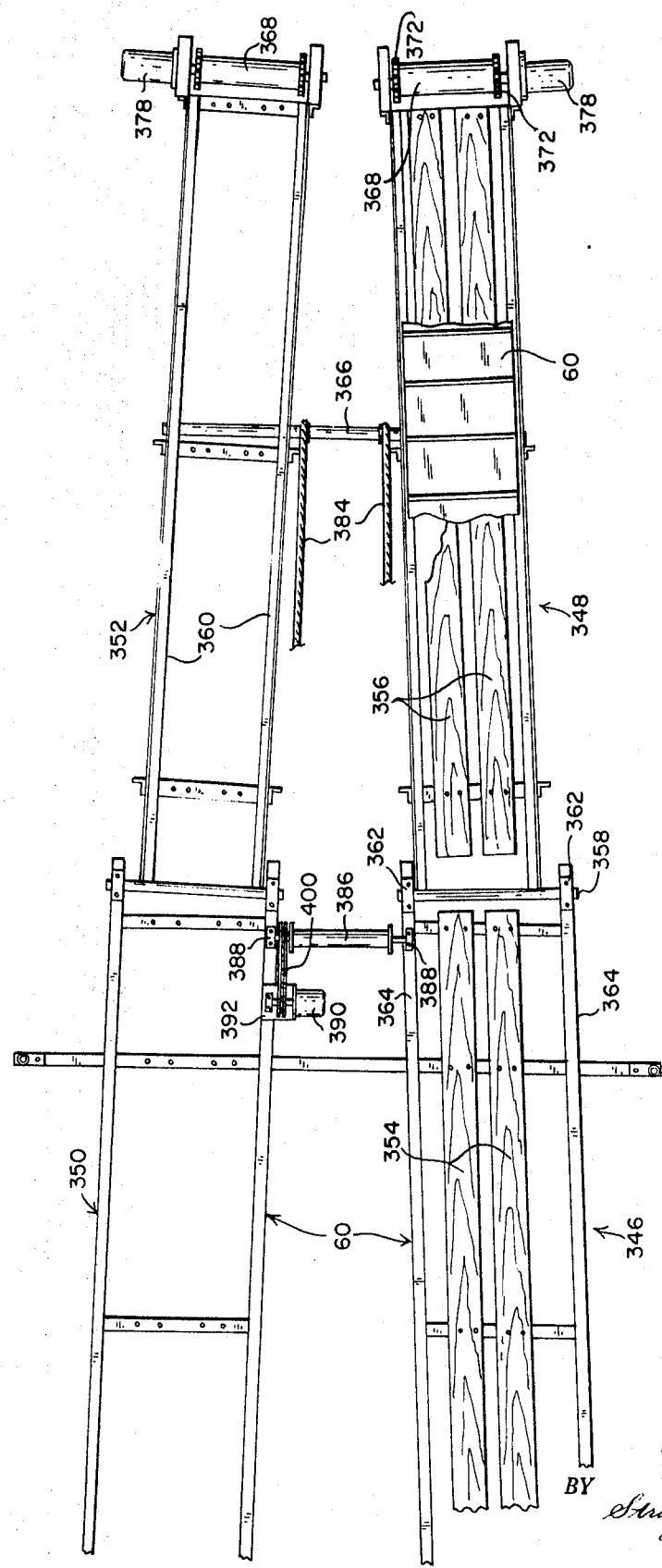
FIG. 12 is a plan view of the conveyors provided in the hop-picking machine of FIG. 1 for receiving and carrying away hops stripped form the vines being picked.
Figure 14:
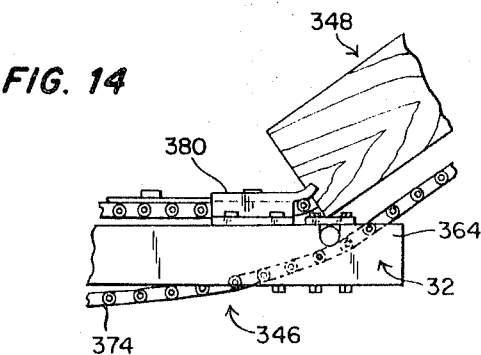
FIG. 14 is a fragment of FIG. 13 redrawn to an enlarged scale to more clearly illustrate certain details of the conveyor mechanism.
Figure 13:
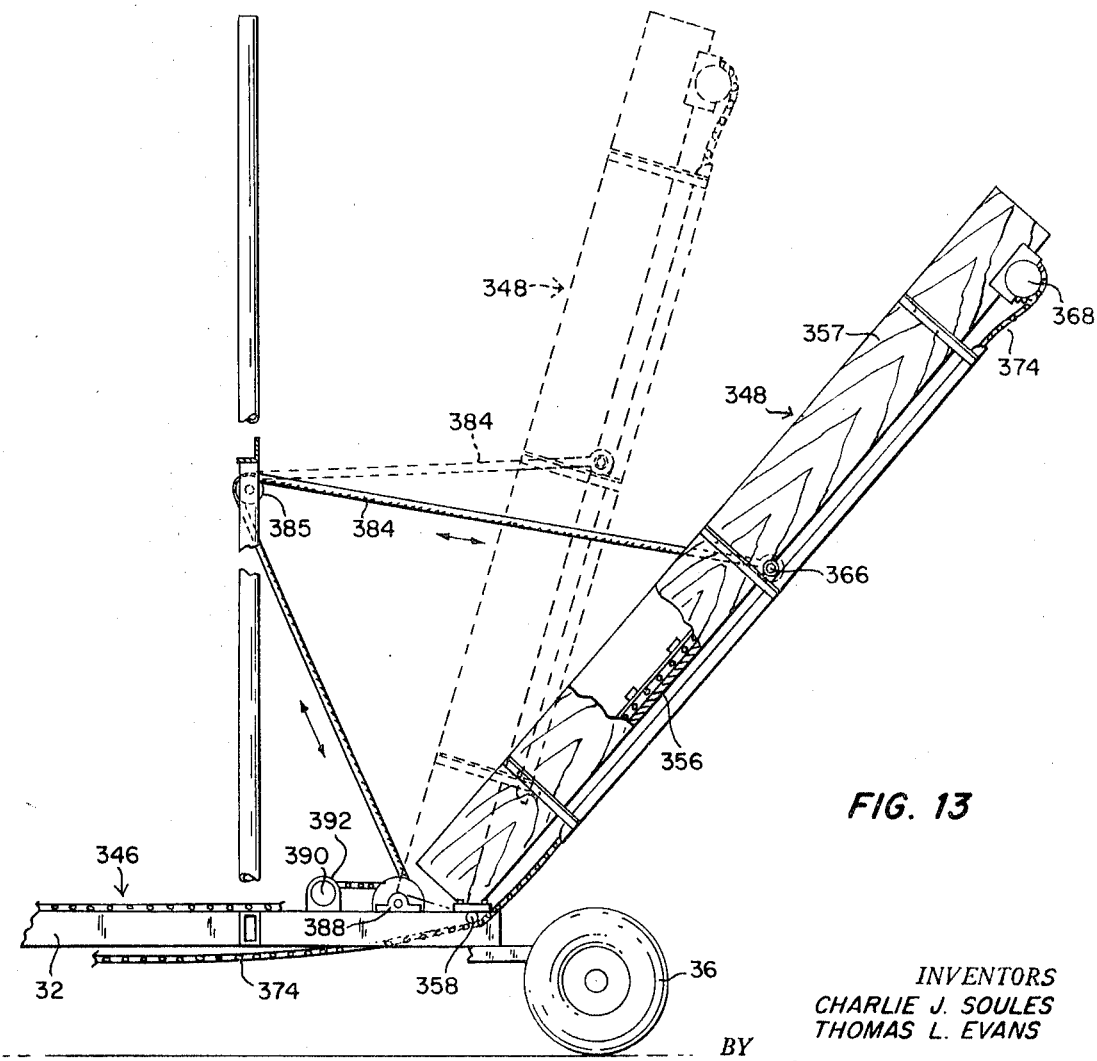
FIG. 13 is a partial side view of the conveyors illustrated in FIG. 12.

As best shown in FIGS. 6, 12, and 13, each of the two conveyor sections 346 and 348 includes a framework 350 and 352 fabricated of structural shapes to which floor members 354 and 356 and sidewalls 357 are attached. The framework 350 of each conveyor is incorporated in the main frame 32 of the hop-picking machine. The hop delivery sections 348 of conveyors 60 are pivotally fixed to the associated fixed sections 346 by pivot members 358 (see FIG. 12). The pivot members are attached to the longitudinal members 360 of delivery section framework 352 and are journaled in bearings 362 mounted on the longitudinal members 364 of fixed conveyor section framework 350 at the rear end thereof. This makes the delivery sections 348 of the conveyors pivotable from the position shown in full lines in FIG. 13 to the positions shown in dotted lines in the same Figure. As they pivot, both delivery sections 34 are made to move in unison by a transversely extending member 366 extending between and fixed to the two conveyor section frameworks 352.

Referring now to FIGS. 6 and 12, rotatably mounted at the front end of fixed conveyor section framework 350 and at the rearmost end of pivotal conveyor section framework 352 are transversely extending rolls 367 and 368 provided with sprockets 370 and 372 around which endless, roller-type chains 374 are trained. Extending between and fastened to each cooperating pair of endless chains 374 are cleated conveyor belts 376 by which the hops stripped from the vines being picked are moved along conveyor sections 346 and 348 and into a truck or other vehicle at the discharge end of conveyor sections 348.

The endless chains 374 and conveyor belts 376 are driven by rotating sprockets 372 via rotary-type, fluid-operated, preferably hydraulic motors 378 mounted on discharge section frameworks 352 adjacent the rear ends of longitudinal framework members 360. As shown in FIG. 12, motors 378 are coupled to the rolls 368 to which sprockets 372 are attached.

To insure that endless chains 374 track properly, the lower or return legs of the chains are trained under the pivot shafts 358 by which the discharge conveyor sections 348 are attached to fixed sections 346. The upper legs of the runs are trained under guides 380 fixed to longitudinal members 364 of fixed conveyor section framework 346 for the same purpose.

As indicated above, rear conveyor sections 348 can be pivoted about shafts 358 to raise or lower their discharge ends between the limit positions shown in full and dotted lines in FIG. 13. This is an important feature of the present invention since it permits the discharge height of the conveyors to be readily adjusted to accommodate hop-receiving vehicles of different types. This arrangement also provides another, less obvious advantage. Specifically, as discussed above, the sides of the two hop-picking lines 50 are enclosed by cooperating sets of walls 332, 336 and 330, 334. By raising conveyor sections 348 to the dotted line position of FIG. 13, the conveyor sections can be made to cooperate with the sidewalls just mentioned to form enclosed, hop-storing compartments. This is advantageous when machine 30 is making a turn at the end of a row or vehicles into which the hops are being discharged are switched, for example, as the hops being stripped while this is taking place can be temporarily stored in the compartment formed by the sidewalls and conveyor discharge sections. Thus, it is not necessary to stop the operation of the picking cats during such circumstances as has heretofore been required.

The mechanism by which conveyor discharge sections 348 are raised and lowered, best shown in FIGS. 12, 13, and 15, includes cables 384 trained around pulleys 385 and fixed to the transverse member 366 connecting the two discharge sections 348 to one end to a transversely extending drum 386 at the other. As shown in FIG. 15, drum 386 is rotatably supported from the longitudinal members 364 of fixed conveyor section framework 350 by bearings 388. By rotating drum 386 to respectively wind cable thereon or to unwind the cable therefrom, cables 384 can either be taken in or payed out to respectively elevate and lower the discharge ends of conveyor sections 348 by pivoting them upwardly and downwardly about shafts 358.

Drum 386 is rotated by a rotary-type, fluid-operated, preferably hydraulic motor 390, which is supported from one of the longitudinal framework members 364 by motor mount 392. Motor 390 is drive connected to drum 386 by a sprocket 394 on its output shaft 396, a sprocket 398 rotatably fixed to drum 386 for rotation therewith, and an endless chain 400 trained around the two sprockets.

Figure 19:
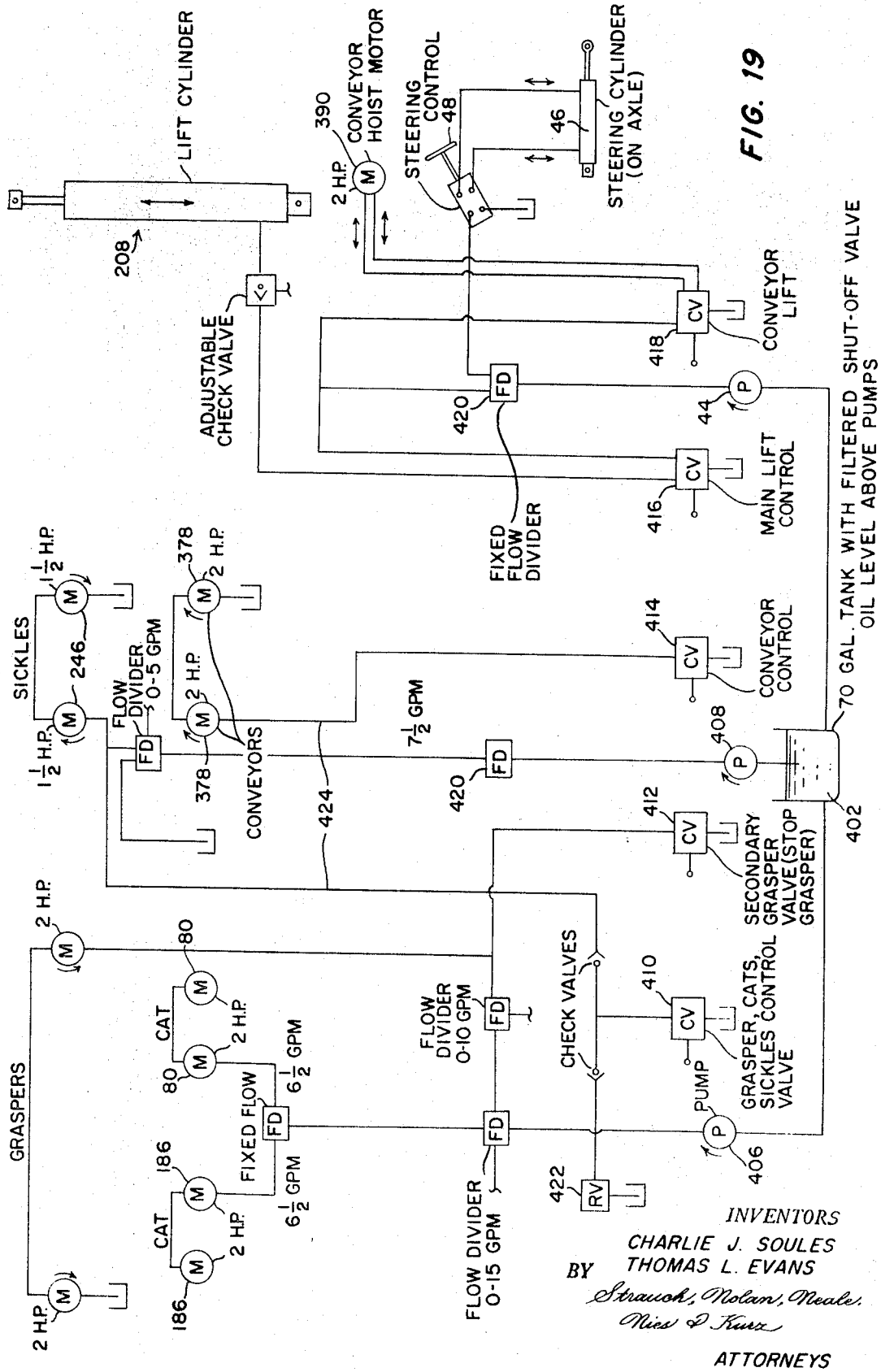
FIG. 19 is a schematic representation of a hydraulic system incorporated in the machine of FIG. 1.

As will be a parent from the foregoing, the various operating mechanisms of hop-picking machine 30 are operated by hydraulic motors of either the rotary or reciprocating type. FIG. 19 shows in schematic form the hydraulic system in which these motors are incorporated. In addition to the several hydraulic motors described above, the hydraulic system includes a reservoir 402, three conventional hydraulic pumps 44 (mentioned above), 406, and 408 and controllers 410—418 of the conventional valve type, which are located adjacent steering control 48 above the operator's platform 419. The components just mentioned, together with a number of conventional flow dividers 420, relief valves 422, and other conventional circuit components are interconnected by hydraulic lines designated generally by reference character 424.

It is believed that the operation of the control system shown in FIG. 19 is apparent from the drawing and from the foregoing detailed description of the various operating mechanisms. Briefly, however, by way of summary, to begin the picking operation, control 410 is opened, allowing hydraulic fluid to be pumped from reservoir 402 to the motors 186 of the four picking cats 54 and 56, to the motors 80, which drive the grasper lines 52 and the vine-ejecting mechanisms 64, and to the tow motors 246 which operate the sickle bar cutters 62. At the same time valve 414 is opened allowing fluid to flow to motors 378 to operate conveyors 60. The machine is then essentially ready to begin picking except for raising the two cat lines 50. This is accomplished by opening valve 416, allowing hydraulic fluid to flow to lift cylinder 208 to elevate the picking cats.

The machine continues to operate in this manner until the end of a row is reached, for example. At the end of the row the operator will typically close valve 414 to stop the conveyors, and open valve 418 to allow fluid to flow to the motor 390 of the conveyor lift mechanism. As discussed above, this elevates the delivery sections of the conveyors to the position shown in dotted lines in FIG. 13. With the conveyors stopped, the picked hops are stored on the conveyor until the turn is completed. At this point, the conveyors may be restarted and the discharge end of conveyor sections 348 lowered to accommodate the height of the carrier into which the picked hops are being discharged.

The remaining control 412 is provided so that the grasper lines 52 may be stopped, when desired, without stopping the picking cats and the cutter mechanisms.

From the foregoing description of an exemplary embodiment of the present invention, it will be apparent that many modifications may be made without departing from the scope or principles of the present invention. For example, it is not essential that that a hydraulic operating system be employed although this is preferable from the standpoint of simplicity. Moreover, it will be obvious to those of ordinary skill in the relevant arts that many of the novel features of the present invention are equally applicable to single-row pickers or to machines capable of picking more than two rows. Accordingly, to the extent that such applications of the principles of the invention are not expressly excluded from the appended claims, they are fully intended to be covered therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come withing the meaning and range of equivalency of the claims are therefore intended to be embraced therein.

What we claim and desire to be secured by Letters Patent is:

1. A machine for field picking hops from vines hanging from overhead supports comprising: frame means; running gear for movement through the field in which the hops are to be picked; means supported by said frame means for grasping the lower ends of said vines to maintain said vines in a picking position; means supported by said frame means for stripping the hops from said vines; conveyor means supported from said frame means for the hops stripped from the vines; means for severing said vines to free them from the overhead supports, said means for severing said vines comprising cooperating fixed and reciprocable cutter bars extending transversely across said machine, said fixed and reciprocable bars having cooperating cutter teeth thereon and said cutter teeth facing the front of the machine, and means for reciprocating the reciprocable cutter bar; and means for expelling the stripped vines from the machine.

2. The hop-picking machine of claim 1, wherein the means for reciprocating the reciprocable cutter bar comprises a rotary-type fluid-operated motor supported from the frame of the machine and means connected between the motor and said reciprocable cutter bar for converting the rotary motion of the motor to reciprocatory motion of the cutter bar.

3. The hop-picking machine of claim 1, wherein the cutter bars are fixed to the picking machine by means providing a pivot axis extending transversely of said machine whereby said cutter bars can be tilted up and down to vary the height of cut.

4. The hop-picking machine of claim 1, together with a rotatably mounted member extending transversely across said machine adjacent said cutter bars and protruding upwardly therebeyond to prevent the vine supports from becoming entangled in said cutter bars.

5. A machine for field picking hops from vines hanging from overhead supports comprising: frame means; running gear supporting said frame means, whereby said machine is made mobile for movement through the field in which the hops are to picked; means supported by said frame means for grasping the lower ends of said vines to maintain said vines in a picking position, said grasping means comprising a track extending longitudinally of said machine and supported from the frame thereon, at least one grasper device including support means adapted to run along said track, and jaw means fixed to said support means and adapted to open as the grasper device reaches the front end of the machine to receive a hop vine stem and to then close to secure said vine as the grasper device is carried toward the rear of the machine and the hops are stripped from the vine; means supported by said frame means for stripping the hops from said vines, conveyor means supported from said frame means for the hops stripped from the vines; means for severing said vines to free them from the overhead supports; and means for expelling the stripped vines from the machine.

6. The hop picking machine of claim 5, wherein said track is curved downwardly at the front end of the machine to accommodate sagging vine supports.

7. The hop-picking machine of claim 5, wherein said support means comprises an endless flexible member and said grasper device further includes means biasing said jaw means toward said endless member to clamp a hop vine stem thererbetween.

8. The hop-picking machine of claim 7, wherein said track has a horizontal and first and second vertical bearing surfaces, one of said vertical bearing surfaces being adapted to be engaged by said endless flexible member, and wherein said support means further comprises a support member, a first roller mounted on said support member and adapted to engage said horizontal bearing surface, a second roller mounted on said support member and adapted to engage the other of said bearing surfaces, and means fixing said endless flexible member to said support member, whereby said endless flexible member is supported from said track and is laterally positioned by said vertical bearing surfaces as it moves therealong.

9. The hop-picking machine of claim 5, wherein said track has a laterally extending flange member of the upper side thereof to shield said track from hops, leaves, and other debris.

10. A machine for field picking hops from vines hanging from overhead supports comprising: at least one pair of picking means for stripping hops from vines passed therebetween; means for grasping the lower ends of said vines to maintain said vines in a picking position as they move through the passage between the picking means; means incorporated in said grasper means for engaging said vines at the entry to the passage between said picking means and for releasing said vines at the exit from said passage; and means for expelling from said machine vines from which the hops have been picked including at least one endless flexible member adjacent said exit having thereon fingers engageable with said vines to pull said vines from said grasping means and eject them from the machine.

11. The hop-picking machine of claim 10, wherein there are a plurality of said vine-expelling members, said members being disposed in vertically spaced apart relationship.

12. A machine for field picking hops from vines hanging from overhead supports comprising: at least one pair of picking means for stripping hops from vines passed therebetween; means for grasping the lower ends of said vines to maintain said vines in a picking position as they move through the passage between the picking means; means incorporated in said grasper means for engaging said vines at the entry to the passage between said picking means and for releasing said vines at the exit from said passage; means for expelling from said machine vines from which the hops have been picked including at least one endless flexible member adjacent said exit having thereon fingers engageable with said vines to pull said vines from said grasping means and eject them from the machine; and a single fluid-operated motor for effecting continuous movement of said grasper means and the endless flexible member of said vine-expelling means.

13. A machine for picking hops from vines hanging from overhead supports comprising: a frame; a pair of picking means, said picking means including endless belts having vertical legs disposed in generally parallel, spaced relationship to define a passage through which the hop vines are adapted to pass, picking fingers carried by said belts, and means for driving said belts to effect vertical movement of said fingers and cause said fingers to strip the hops from vines moving through the passage between said picking means; means joining said pair of picking means into a unitary assembly; means supporting said unitary assembly from the frame of the machine for up and down movement relative to said frame; and means for raising and lowering said unitary assembly relative to said frame to thereby raise and lower said picking means to compensate for variations in the height of the overhead supports from which the vines are suspended.

14. The hop-picking machine of claim 13, wherein the means joining said pair of picking means into a unitary assembly comprises transversely extending beams at the front and rear of the machine, both of said picking means being supported from said front beam and from said rear beam, and wherein the means for raising and lowering said unitary assembly comprises a hydraulic motor for raising and lowering in one of said beams and means so linking the other beam to said one beam that both beams move upwardly and downwardly simultaneously as said one beam is raised and lowered by said hydraulic motor.

15. A self-propelled machine for picking vines suspended from overhead supports comprising: frame means; running gear supporting said frame means which comprises dirigible wheels; and traction wheels; motor means supported from said frame and drive connected to said traction wheels for propelling the machine through the field in which the hops are to be picked; means for grasping the lower ends of said vines to maintain said vines in a picking position; means for stripping the hops from said vines; means for receiving the hops stripped from said vines; means for severing said vines to free them from said overhead supports; and means for discharging the stripped vines from the machine; said grasping means comprising a track extending longitudinally of said machine and supported from the frame thereof, at least one grasper device including support means adapted to run along said track and jaw means fixed to said support means and adapted to open as the grasper device reaches the front end of the machine to receive a hop vine stem and to then close to secure said vine as the grasper device is carried toward the rear of the machine and the hops are stripped from the vine; the means for stripping hops from the hop vines comprising a pair of picking means including endless belts having vertical flights disposed in parallel spaced relationship to define a passage through which the hop vines are adapted to pass, picking fingers carried by said belts, and means for driving said belts to effect vertical movement of said fingers and cause said fingers to strip the hops from vines moving through the passage between said picking means; and the means for severing said vines comprising cooperating fixed and reciprocable cutter bars extending transversely across said machine and having cutter portions facing the front of the machine and means for reciprocating the reciprocable cutter bar.

16. The hop-picking machine of claim 15, wherein the means for receiving the hops stripped from the vines comprises a conveyor below and extending the length of picking means for carrying away hops stripped from said vines and falling thereonto, said conveyor means comprising endless belt means and drive means for effecting movement of said belt means, and said machine further comprising wall means cooperating with said conveyor to provide a compartment and selectively operable means for interrupting the drive means and thereby stopping said belt means, whereby hops may be accumulated in said compartment.

17. The hop-picking machine of claim 16, wherein said conveyor comprises rotatably mounted supports on the front and rear of said machine, said endless belt means being trained around said support means, and wherein said motor is of the fluid-operated type and is directly drive connected to one of said rotatably mounted supports.

18. The hop picking machine of claim 16, wherein said conveyor includes a first, fixed section below and extending generally the length of said picking means for receiving the hops stripped from said vines, a second section pivotally fixed at its forward end to said first section at the rear of said machine and extending beyond the rear of the machine for transferring the hops from the first conveyor section to a vehicle or the like, and selectively operable means for pivoting said second conveyor section to raise and lower the rearward end of said second conveyor section to thereby adjust the discharge height of the second conveyor section.

19. A hop-picking machine comprising: at least one pair of vertically extending picking means for stripping the hops from vines passed therebetween and a conveyor for carrying away the hops stripped from said vines, said conveyor including a first, fixed section below and extending generally the length of said picking means for receiving the hops stripped from said vines and a second section pivotally fixed at its forward end to said first section at the rear of said machine and extending beyond the rear of the machine for transferring the hops from the first conveyor section to a vehicle or the like and selectively operable means for pivoting said second conveyor section to raise and lower the rearward end of said second conveyor section to thereby adjust the discharge height of the second conveyor section which comprises a rotatable drum, at least one flexible link trained around said drum and connected to said second conveyor section, a motor drive connected to said drum for rotating said drum, and selectively operable means for energizing said motor in forward and reverse directions to thereby so rotate said drum as to wind the link on said drum or unwind it therefrom to respectively raise and lower the rear end of said second conveyor section.

20. A hop-picking machine comprising: at least one pair of vertically extending picking means for stripping the hops from vines passed therebetween and a conveyor for carrying away the hops stripped from said vines, said conveyor including a first, fixed section below and extending generally the length of said picking means for receiving the hops stripped from said vines; a second section pivotally fixed at its forward end to said first section at the rear of said machine and extending beyond the rear of the machine for transferring the hops from the first conveyor section to a vehicle or the like; an endless belt means spanning said first and second conveyor sections; a fluid-operated motor mounted on said second conveyor section for effecting movement of said belt means; and selectively operable means for pivoting said second conveyor section to raise and lower the rearward end of said second conveyor section to thereby adjust the discharge height of the second conveyor section.